United States Patent [19]

Amano et al.

[11] 4,120,005
[45] Oct. 10, 1978

[54] MODE SELECTING DEVICE FOR TAPE RECORDING AND/OR REPRODUCING APPARATUS

[75] Inventors: Kenichi Amano; Yutaka Suzuki; Yoshio Kishi, all of Tokyo, Japan

[73] Assignee: Sony Corporation, Tokyo, Japan

[21] Appl. No.: 776,478

[22] Filed: Mar. 10, 1977

[30] Foreign Application Priority Data

Mar. 10, 1976 [JP] Japan .................................. 51-26513

[51] Int. Cl.² ........................ G11B 15/12; B41J 23/34
[52] U.S. Cl. ........................................ 360/61; 74/479;
400/187; 400/360
[58] Field of Search ...................... 360/137, 61, 62, 96;
197/98, 107, 14; 74/479, 477, 483, 503

[56] References Cited

U.S. PATENT DOCUMENTS

| | | | |
|---|---|---|---|
| 3,229,547 | 1/1966 | Hill | 74/477 |
| 3,566,711 | 3/1971 | Leuenberger | 74/477 |
| 3,821,800 | 6/1974 | Maltese | 360/62 |
| 3,940,800 | 2/1976 | Tabuchi | 360/137 |
| 3,947,894 | 3/1976 | Chimura | 360/137 |

Primary Examiner—Jay P. Lucas

Attorney, Agent, or Firm—Lewis H. Eslinger; Alvin Sinderbrand

[57] ABSTRACT

A mode selecting device for a tape recording and/or reproducing apparatus includes a plurality of push-button members which are selectively actuable from rest positions to active positions for selecting corresponding operating modes of the apparatus, electrically energizable driving means, such as, solenoids, which are energized in response to the actuation of a selected one of the push-button members to an active position, operating members selectably movable by said driving means from inoperative positions to operative positions in response to the energizing of selected solenoids and being urged to an inoperative position upon deenergizing of such solenoids, a plurality of transmission members coupled with the operating members which are moved in response to the actuation of a respective one of the push-button members for establishing the corresponding operating mode of the apparatus by the movement of the operating member to its operative position, and a release operative, for example, by actuation of a stop push-button member, to release the operating member to return it to its inoperative position for halting a previously selected operating mode.

8 Claims, 18 Drawing Figures

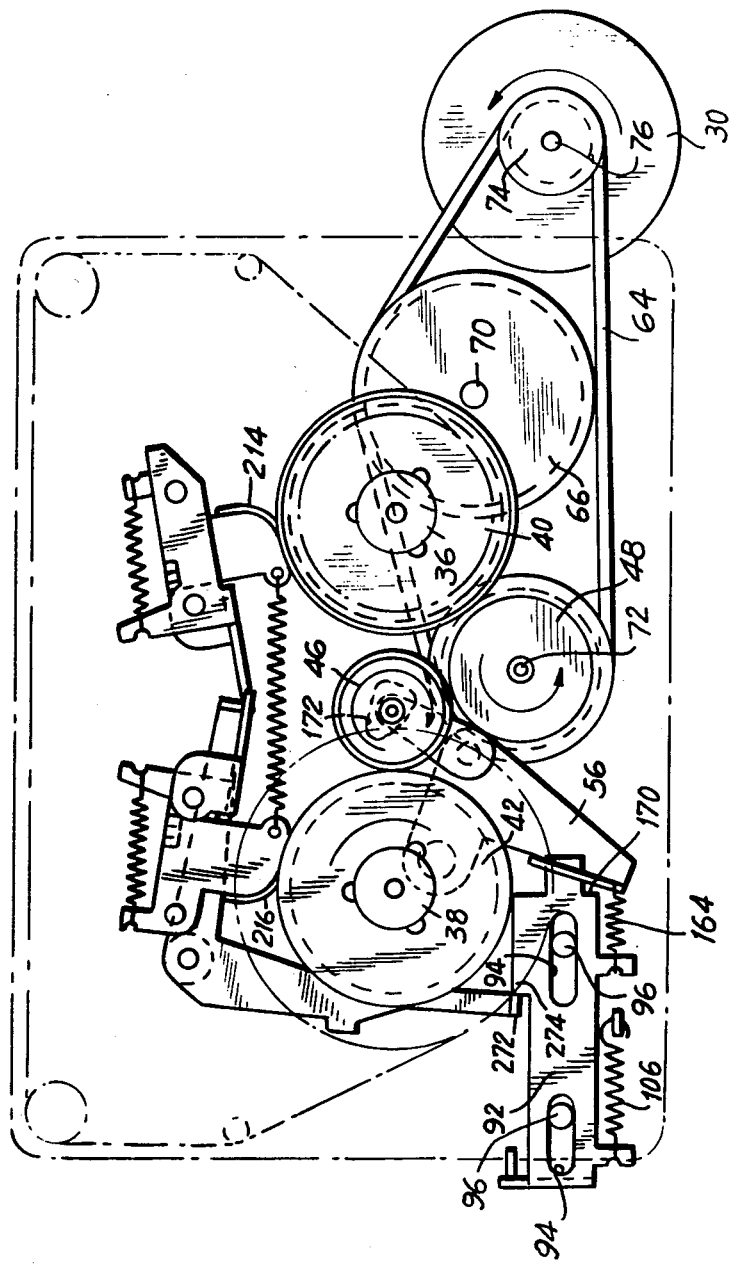

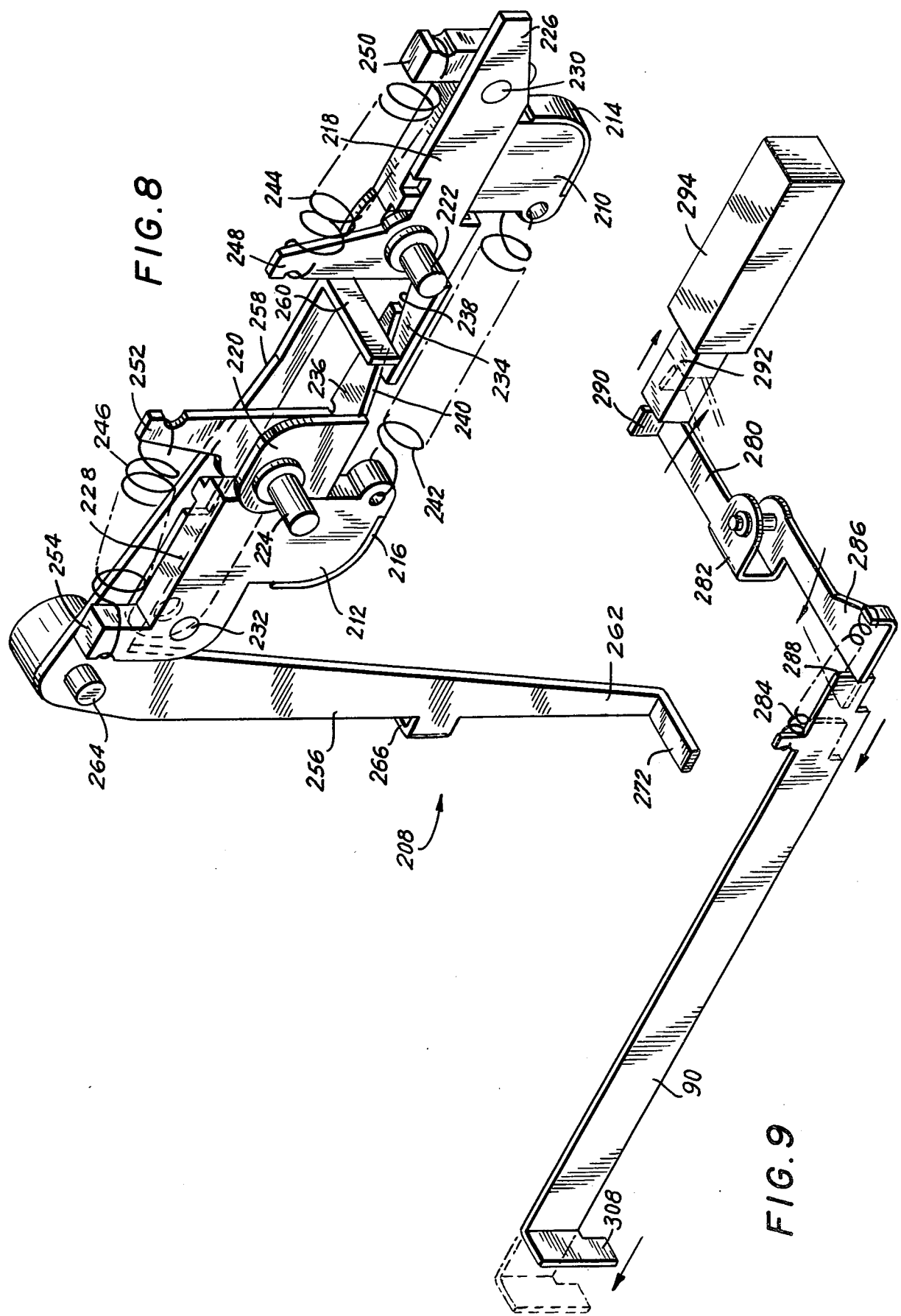

MODE SELECTING DEVICE FOR TAPE RECORDING AND/OR REPRODUCING APPARATUS

BACKGROUND OF THE INVENTION

1. Field of the Invention

This invention relates generally to tape recording and/or reproducing apparatus, and more particularly is directed to improvements in operating mode selecting devices of the so-called "feather-touch" type for such apparatus.

2. Description of the Prior Art

Mode selecting devices of the "feather-touch" type have been provided for audio and video tape recording and/or reproducing apparatus in which the operator selectively actuates any desired one of a plurality of push-buttons corresponding to the various operating modes of the apparatus, for example, the modes for normal-forward transport of the tape as during recording and reproducing operations, for fast-forwarding of the tape and for rewinding of the tape, and such actuation of any selected push-button causes closing of a switch for energizing an electrically powered drive and also displaces a corresponding transmission member to an active position where it can be driven by the energized driver for establishing the selected operating mode of the apparatus. Further, in the existing mode selecting devices, each of the push-buttons for selecting an operating mode of the apparatus is locked in its active position upon its actuation to such active position from a rest position so as to maintain the selected operating mode of the apparatus until the locking action is released in response to either the actuation of a stop push-button or the actuation of another one of the operating mode selecting push-buttons, whereupon the previously actuated push-button is free to be spring-urged to its rest position for halting the operation of the apparatus in the respective operating mode.

Mode selecting devices of the above described type are advantageous in that only a relatively light force need be applied by the operator to a selected push-button for actuating the latter as such manually applied force is only required to close the switch and to displace the corresponding transmission member to its active position, while the major force for establishing the selected operating mode is applied by the electrically powered driver through the active transmission member. However, in such existing mode selecting devices, an electrically powered driver, for example, a solenoid, is used for each separate mode selection push-button. Thus these mechanisms become needlessly bulky and cumbersome due to the great number of solenoids employed.

There are also existing mode selecting devices of the "feather-touch" type in which a single solenoid is employed to provide the motive force for establishing any selected one of a plurality of operating modes of a tape recording and/or reproducing apparatus in response to the actuation of a respective mode selecting push-button. Some of these are relatively bulky, complex and expensive to produce, and thus are not ideally suited for incorporation in relatively low cost or portable tape recording and/or reproducing apparatus.

In U.S. Pat. No. 3,947,894, assigned to the same assignee as this application, a mode selecting device of the "feather-touch" type is shown which employs a single intermittently operable solenoid employed to provide the motive force for establishing a selected one of a plurality of operating modes for a tape recording and/or reproducing apparatus. While such a device has been found to be effective, further modification so as to allow for incorporation into more sophisticated tape recording and/or reproducing apparatus has been achieved by utilizing more than one solenoid to provide the motive force for selecting one of a plurality of operating modes.

The present invention provides selectability between a plurality of operating modes without utilizing a separate solenoid for each operating mode, as some prior art devices do, so that one of the bulkiness and expense of this type of prior art device is eliminated.

OBJECTS AND SUMMARY OF THE INVENTION

Accordingly, it is an object of this invention to provide a mode selecting device of the "feather-touch" type employing a plurality of solenoids or other electrically powered drivers to provide the motive force for establishing a selected operating mode of a tape recording and/or reproducing apparatus.

More specifically, it is an object of this invention to provide a mode selecting device of the "feather-touch" type, as aforesaid, in which the number of solenoids or other electrically powered drivers employed is less than the number of mode selecting choices for establishing a selected operating mode of the tape recording and/or reproducing apparatus in response to actuation of a respective push-button, and, thereafter, the selected operating mode is maintained until such time as a stop push-button is actuated for terminating operation of the apparatus in the selected operating mode.

Another object is to provide a mode selecting device of the "feather-touch" type which employs solenoids or other electrically powered drivers to provide the motive force for establishing any selected operating mode of a tape recording and/or reproducing apparatus, and which is relative simple, inexpensive and compact.

A further object is to provide a mode selective device, as aforesaid, which is reliable in operation, and which incorporates several features for preventing malfunctioning of the device.

In accordance with an aspect of this invention, a mode selecting device for a tape recording and/or reproducing apparatus includes a plurality of electrically energizable drivers, such as solenoids, which are selectively energized in response to the actuation of a selected push-button from its rest position to an active position, selected ones of a plurality of operating members are movable by the selected drivers from inoperative positions to operative positions in response to the energizing of the selected drivers and are urged to the inoperative position upon deenergizing of the driver, a plurality of transmission members each being selectively coupled to selective ones of the operating members and movable in response to the actuation of a respective push-button for establishing the corresponding operating mode of the apparatus by movement of the operating member to its operative position, and a release operative, for example, by actuation of a stop push-button, to release the assembly and permit the return of the operating member to its inoperative position for halting a previously selected operating mode.

The above, and other objects, features and advantages of the invention, will be apparent in the following detailed description of an illustrative embodiment

BRIEF DESCRIPTION OF THE DRAWINGS

FIG. 7 is a view similar to FIG. 3 showing the reproducing device of the present invention when the rewind mode is operative;

FIG. 8 is a partial perspective view showing selected details of the tape braking mechanism of the present invention;

FIG. 9 is a partial perspective view showing selected details of a mode selecting slide of the present invention;

The present invention may be used in any type of recording and/or reproducing apparatus, such as a tape recorder, where it is desired to provide a selection between various operating modes. Typically the desired modes are record, play-back, tape rewind, fast forward, pause and top. In describing a preferred embodiment of the present invention specific reference will be made to that type of tape recording and/or reproducing apparatus disclosed in commonly assigned pending applications Ser. No. 712,770, filed Aug. 9, 1976 now U.S. Pat. No. 4,050,087 and Ser. No. 720,742, filed Sept. 7, 1976, which applications are incorporated herein by reference. However, it is to be expressly understood that the mode selecting device of the present invention can be employed with equal facility in any type of tape recording and/or reproducing apparatus.

Figure 1:
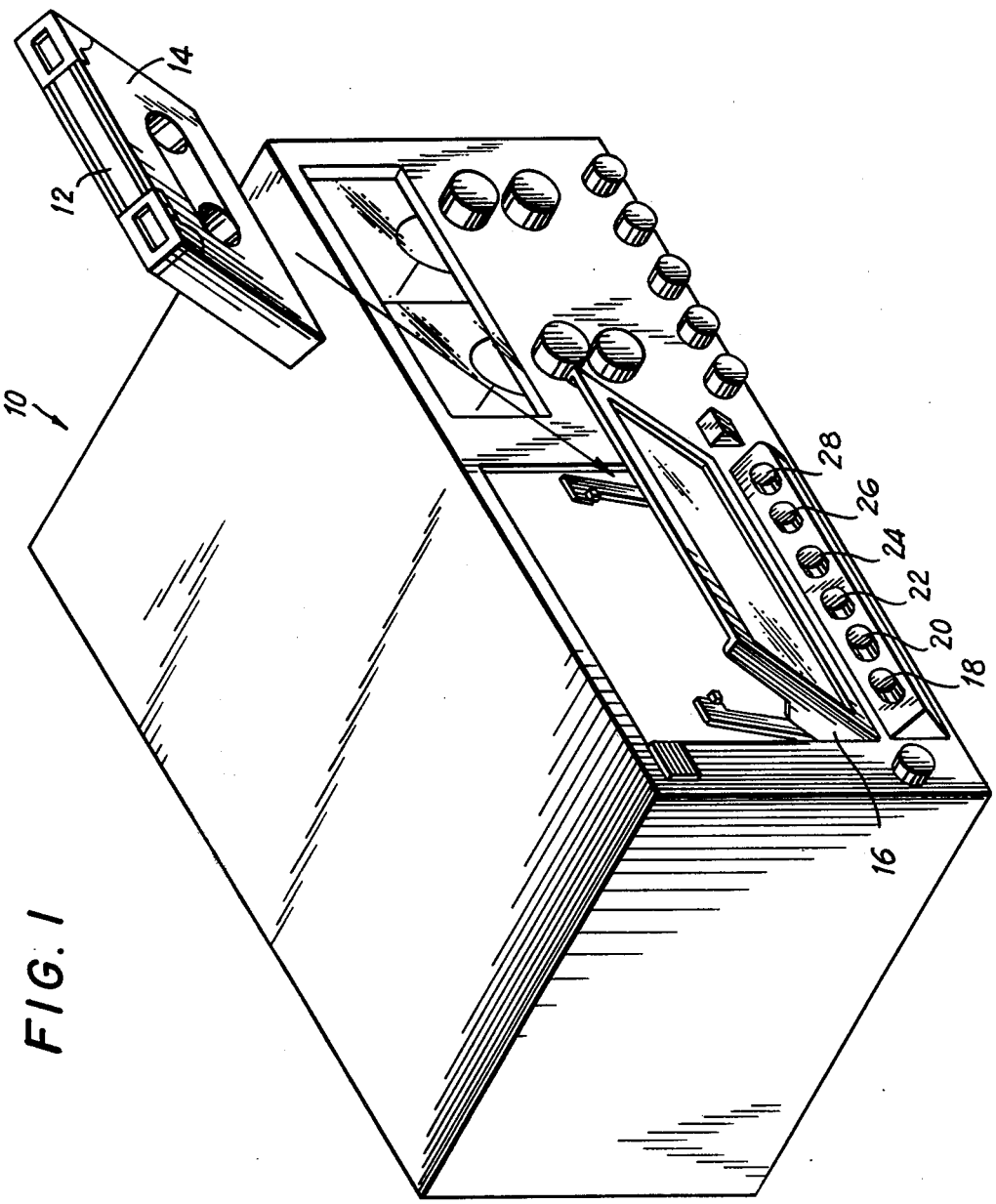
FIG. 1 is a perspective view showing a representative recording and/or reproducing apparatus incorporating the mode selecting device of the present invention.

With the foregoing in mind reference is now made to FIG. 1 of the drawing which shows a tape recording and reproducing apparatus 10 of the type described in greater detail in the aforesaid pending applications. The tape medium 12 for apparatus 10 is housed in a tape cassette 14 which is loaded into apparatus 10 by a cassette loading mechanism 16. Apparatus 10 also includes a plurality of push-button members 18, 20, 22, 24, 26 and 28 which are selectively depressable to select one of the operating modes for apparatus 10 such as, record, playback, tape rewind, tape fast forward, pause and stop.

Reference is now made to FIGS. 2 to 9 for a description of the tape transport mechanism of apparatus 10 and its interrelationship with the mechanism for selecting one of the operating modes of apparatus 10.

Figure 2:
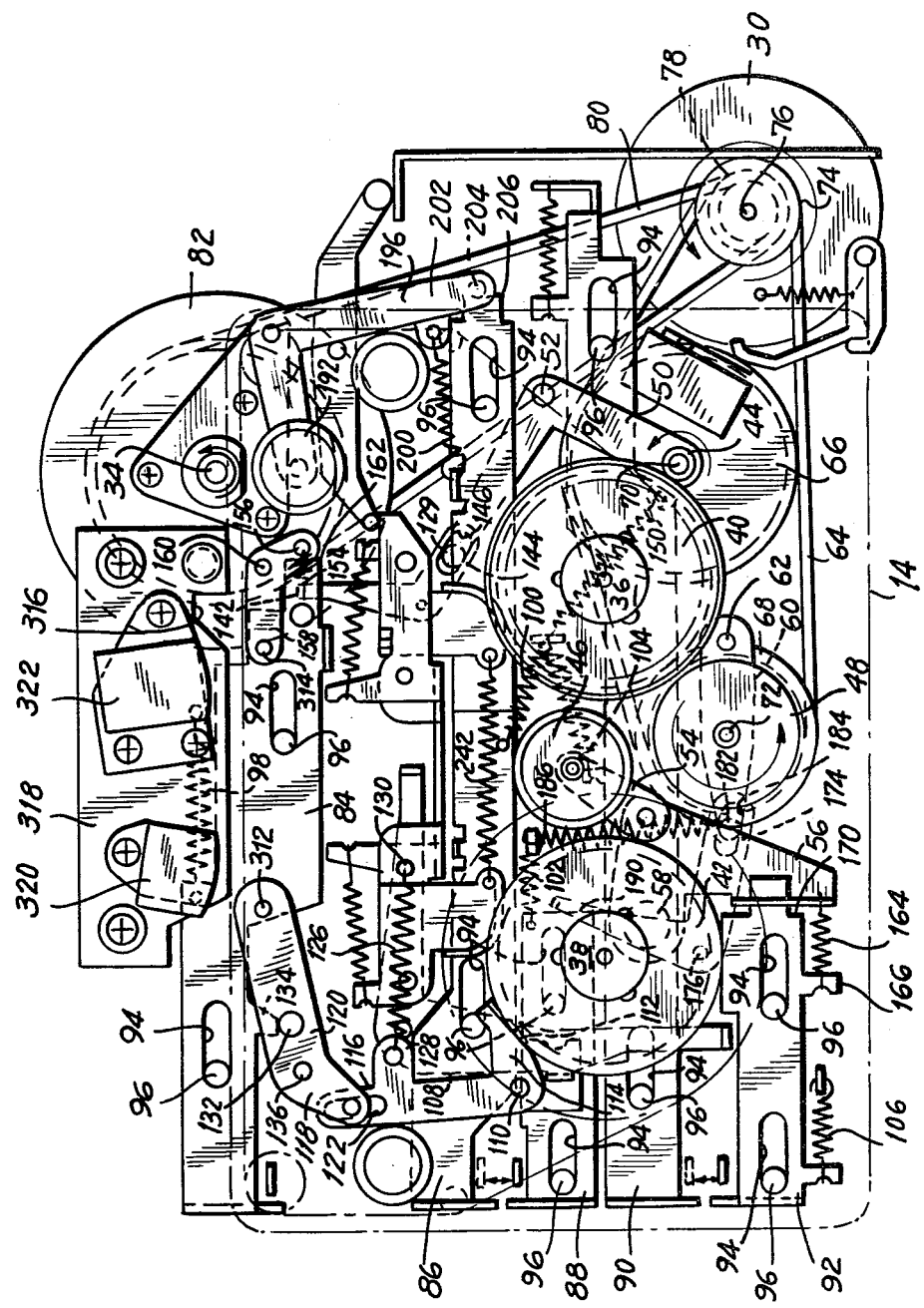
FIG. 2 is a detailed plan view showing the tape transport mechanism of the recording and/or reproducing apparatus and details of the mode selecting mechanism when the stop mode is operative.
Figure 12:
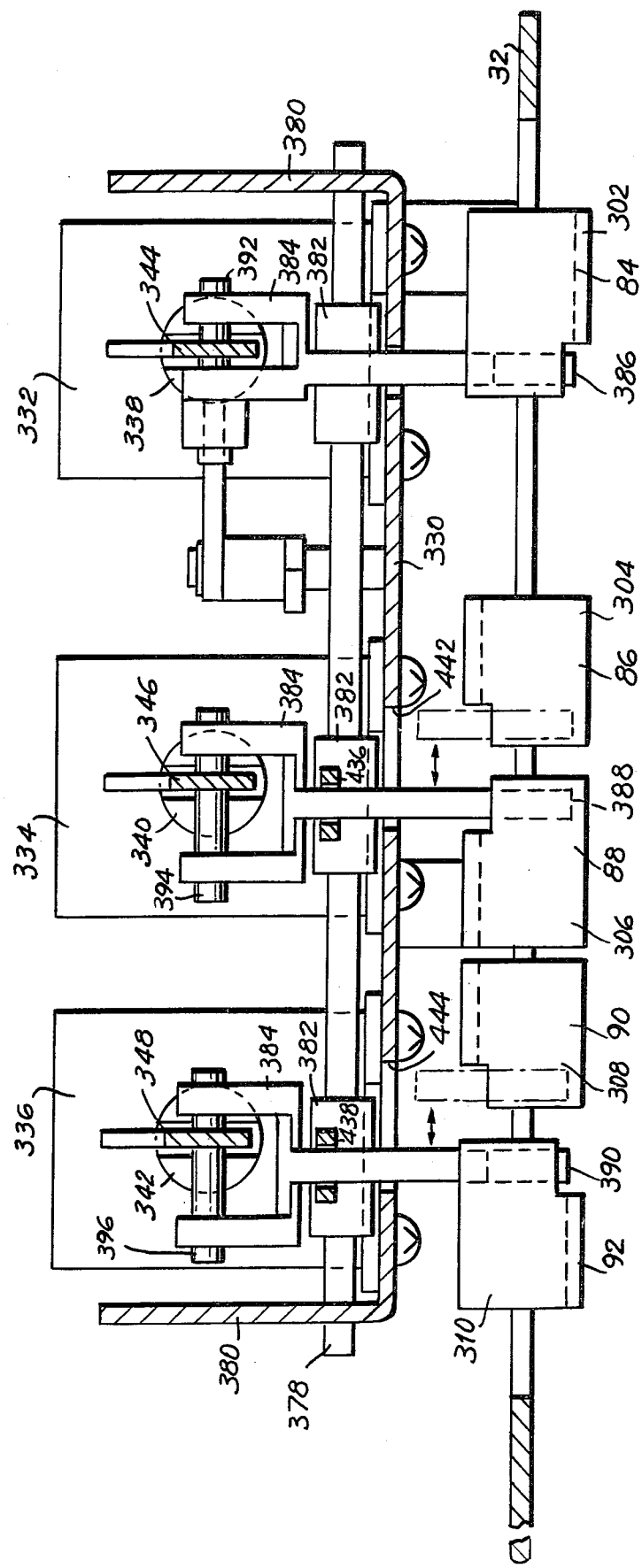
FIG. 12 is a sectional view taken along line 12—12 of FIG. 10.

As best seen in FIG. 2, the tape transport mechanism of the recording and/or reproducing apparatus 10 includes a motor 30 mounted on a supporting chassis 32 (see FIG. 12) to selectively drive a capstan 34 and reel shafts 36 and 38, respectively, in response to the operating mode selected for the recording and/or reproducing apparatus 10. Included within the tape transport mechanism of the apparatus 10 are reel mounts 40 and 42 through which the reel shafts 36 and 38, respectively, are secured. The reel shafts 34 and 36 are engageable within the hubs of the tape spools in cassette 14. A forward idler 44 is arranged to the side of take-up reel mount 40, a rewind idler 46 and a fast foward idler 48 are arranged between reel mounts 40 and 42. Forward idler 44 is rotatably supported on one end of an L-shaped idler lever 50 which is pivotally secured by a pin 52 mounted on chassis 32 so that the lever 50 is rotatable relative to the chassis. Rewind idler 46 is rotatably supported on a swing arm 54 connected to one end of an idler lever 56 which is pivotally secured by a support pin 58 to the chassis so that lever 56 is rotatable relative to the chassis. Fast forward idler 48 is rotatably supported on an idler lever 60 which is pivotally secured by a support pin 62 so that lever 60 is rotatable relative to the chassis.

Forward idler 44 and fast forward idler 48 are driven by motor 30 through a belt 64 wound about pulleys 66 and 68 fixed respectively to shafts 70 and 72 of forward idler 44 and fast forward idler 48. Belt 64 also passes about a drive pulley 74 fixed to the output shaft 76 of motor 30. A second drive pulley 78 is also fixed to motor output shaft 76 and a belt 80 is wound about pulley 78 and about flywheel 82 which is fixed to capstan 34 so that the flywheel and capstan are driven by a motor 30 through belt 80. In addition, rotation of motor 30 also drives the idlers 44 and 48 through belt 64.

Selection of the various drive alternatives for the selected mode of operation for apparatus 10 is accomplished through five mode change-over slides or mode operating levers 84, 86, 88, 90 and 92 which are spaced from each other and horizontally supported on the chassis 32. Each slide 84–92 includes a pair of elongated slots 94 into which extends guide pins 96 fixed to the chassis 32. The slides are thus slidable in the rightward and leftward directions as viewed in FIG. 2 to the limit of the slots 94. Slides 84–92 are biased to the right by means of tension springs 98, 100, 102, 104 and 106, respectively, each having one end fixed to its respective slide and the other end to a lug extending from the chassis.

Figure 3:
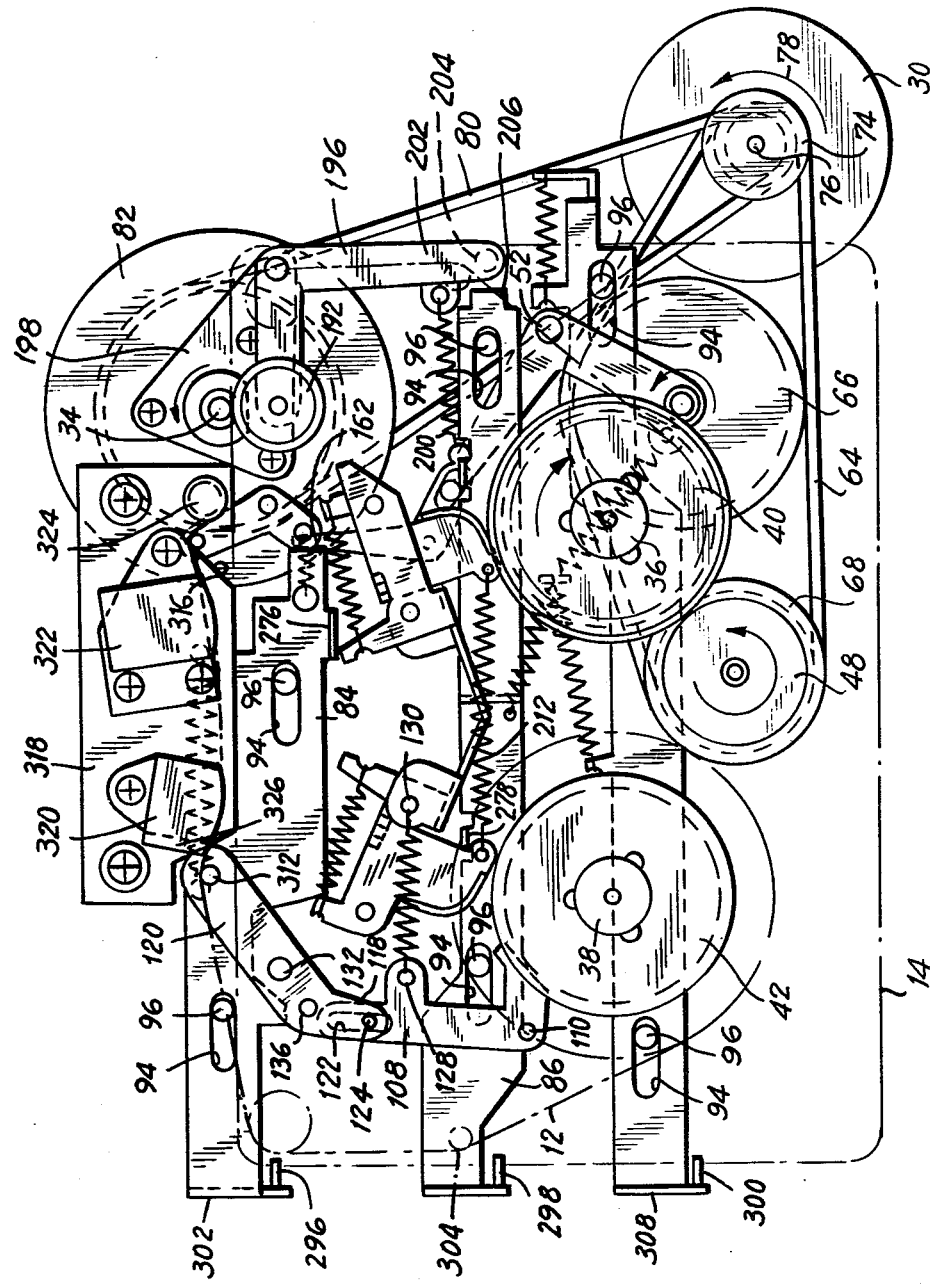
FIG. 3 is a plan view similar to FIG. 2 with certain parts not shown showing the mode selecting device of the present invention when the recording mode is operative.

One of the features desired in the type of recording and/or reproducing apparatus 10, as disclosed in the aforementioned pending applications, is the feature of maintaining constant tape tension on the tape 12 during its operation in a record or reproduce mode. Accordingly, provision is made to provide a slight braking force or drag in the tape transport which maintains a uniform drag on the tape by keeping a slight braking force on the take-up reel. To accomplish this a tension regulating lever 108 is arranged adjacent supply reel mount 42. Lever 120 is rotatably supported by a support pin 110 extending from the chassis so as to be rotatable relative to the chassis 32. A brake shoe 112 is fixed on one end 114 of tension regulating lever 108 so as to be selectively urged against the circumferential surface of reel mount 42. The other end 116 of the tension regulating lever 108 is connected to one end 118 of a tension arm 120 by means of an elongated slot 122 formed on lever 108 which receives a pin 124 extending from end 118 of tension arm 120. A tension spring 126 urges tension regulating lever 108 to rotate in a clockwise direction (FIG. 2). Spring 126 is secured at one end to an extending lug 128 of lever 108 and at its other end to a pin 130 extending from the chassis. Thus tension arm 120 is also urged in a counter-clockwise direction about its pivoting mounting on a pin 136 extending from chassis 32. A pin 132 fixed on the tension arm 120 normally contacts a cam projection 134 formed integrally with the lower edge of mode change-over slide 84. Thus when mode change-over slide 84 is in its rightmost position as shown in FIG. 2, cam projection 134 in contact with tension arm 120 limits the rotation of the tension arm. However, as seen in FIG. 3, when mode change-over slide 84 moves to its leftmost position, cam projection 134 moves out of contact with pin 132 so that tension arm 120 may pivot under the urging of spring 126 to bring brake shoe 112 into contact with the surface of reel mount 42.

The position of mode change-over slide also controls movement of forward idler 44 in the drive train of the tape transport mechanism to bring idler 44 into contact with the circumferential surface of reel mount 40. To this end an L-shaped interconnecting lever 138 is provided which interconnects mode change-over slide 84 and idler lever 50. Lever 138 is rotatably supported on a pin 140 extending from chassis 32 so as to be rotatable relative to the chassis. One end 142 of lever 138 is operatively engaged by change-over slide 84 while the other end 144 includes an elongated slot 146 which slidably accommodates a pin 148 extending from the end of idler lever 50. Idler lever 50 is urged in the clockwise direction (FIG. 2) around its support pin 52 by a tension spring 150 functioning as a limiter spring. Accordingly, interconnecting lever 138 is urged in a counter-clockwise direction around its support pin 140. Thus the position of mode change-over slide 84 determines the engagement of idler 44 with reel hub 40. In the rightmost position shown in FIG. 2, idler wheel 44 is not in contact with reel hub 40 and thus hub 40 is not driven. When mode change-over slide 84 is moved to the left, shown in FIG. 3, idler 44 is moved into contact with hub 40 so that hub 40 is driven by motor 30 through the drive train.

Since the present invention is being illustratively described with specific reference to the type of apparatus and tape cassette described in the aforementioned copening applications, provision is also made to shift tape 12 out of the cassette for its play in apparatus 10.

Accordingly, apparatus 10 includes provision for shifting tape out of the cassette. To accomplish this, end 142 of interconnecting lever 138 is in contact with a pin 152 extending from mode change-over slide 84.

A tension spring 154 functioning as a shifter spring extends between pin 154 and a pin 156 fixed on one end of a tape shifter lever rotatabkly mounted on a pin 160 extending from chassis 32. Pin 156 normally contacts end 162 of mode change-over slide 84 and as slide 84 moves from the position shown in FIG. 2 to that shown in FIG. 3, lever 158 rotates under the urging of spring 154 to shift tape out of the cassette.

Further aspects of selective engagement of the drive train are controlled by movement of respective mode change-over slides as will be explained more fully hereinafter. As an example of such controls, mode change-over slide 92 controls positioning of rewind idler 46 which, as noted above, is rotatably mounted on swing arms 54 connected to one end of idler lever 56. A tension spring 164, which functions as a limiter spring, is provided between a lug extension 166 of mode change-over slide 92 and one end 168 of idler lever 56. End 168 of idler lever 56 is normally in contact with a shoulder 170 adjacent the end of slide 92. Thus movement of mode change-over slide 92 from its rightmost position shown in FIG. 2 to the leftmost position shown in FIG. 7 pivots idler lever 56 and, consequently, shifts the position of rewind idler 46 from a first position removed from the drive train (FIG. 2) to a second position (FIG. 7) where idler 46 is in contact with fast forward idler 48 being driven by motor 30. In this second position rewind idler 46 also moves into contact with reel hub 42 and thus drives reel hub 42 to effect a tape rewinding operation. This movement is guided by a guide opening 172 formed in chassis, 32, see FIG. 7, through which the shaft of idler 46 extends.

Figure 6:
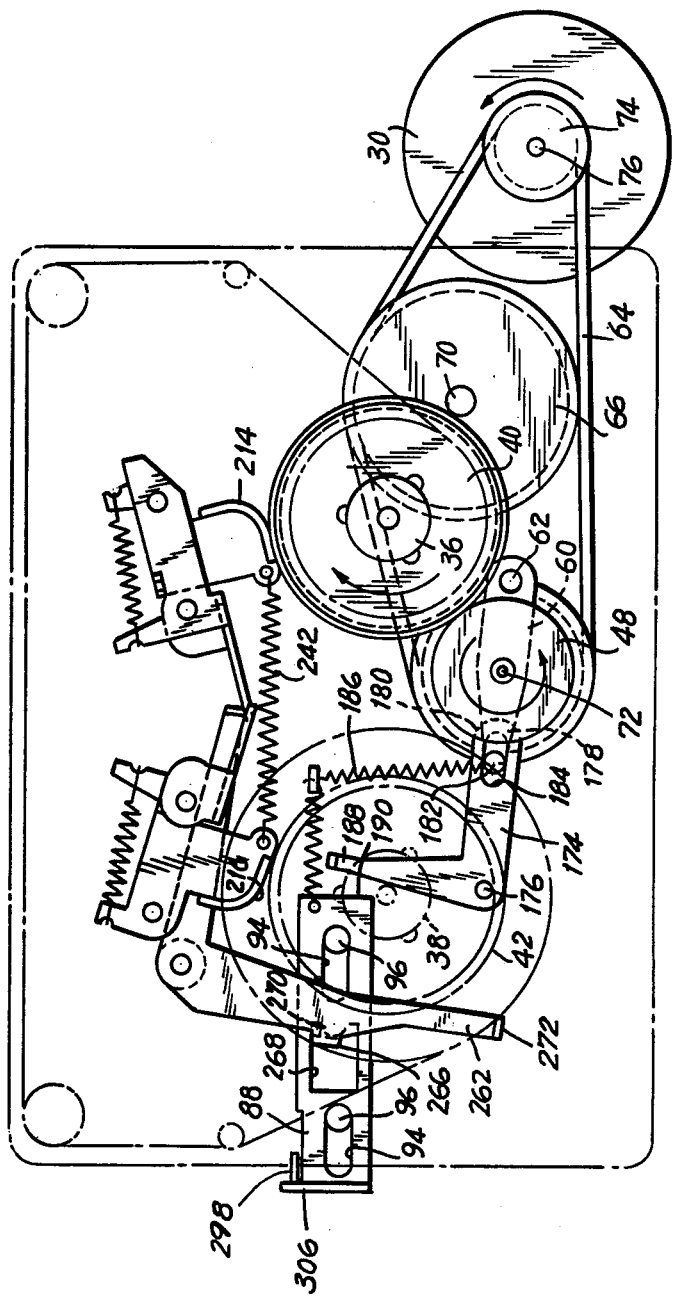
FIG. 6 is a view similar to FIG. 3 showing the mode selecting device of the present invention when the fast forward mode is operative.

The position of fast forward idler 48 is also controlled by movement of one of the mode change-over slides. As seen in FIGS. 2 and 6, mode change-over slide 88 controls the position of fast forward idler 48 relative to reel hub 40. An L-shaped interconnecting lever 174 is arranged between idler lever 60 and mode change-over slide 88 and is rotatably supported by a support pin 176 so as to be rotatable relative to chassis 32. One end 178 so as to be rotatable relative to chassis 32. One end 178 of idler lever 60 is connected with one end 180 of interconnecting lever 174 by means of a pin 182 extending from lever 60 slidably positioned in an elongated slot 184 in end 180 of lever 174. Idler lever 60 is urged in a clockwise direction, as viewed in FIG. 2, by a tension spring 186 functioning as a limiter spring. Accordingly, interconnecting lever 174 is urged in the counter-clockwise direction. The other end 188 of interconnecting lever 174 is contacted by the end 190 of mode change-over slide 88 when slide 88 is in the position shown in FIG. 2. When slide 88 moves to the position shown in FIG. 6 spring 186 moves lever 174 and, hence, idler 48 into contact with reel hub 40.

Movement of the pinch roller 192 into contact with capstan 34, to pinch tape 12 therebetween, is effected by movement of mode change-over slide 86. As best seen in FIGS. 2 and 3, the support pin 194 of L-shaped pinch roller arm 196 is fixed on a bearing plate 198 for capstans 34. Pinch roller arm 196 is urged in the clockwise direction, as viewed in FIG. 2, by a tension spring 200, functioning as a limiter spring. Spring 200 is extended between one leg 202 of pinch roller arm 196 and mode change-over slide 86. A pin 204 extending from leg 202 of pinch roller arm 174 is positioned for abutting contact with end 206 of mode change-over slide 86 when slide 86 is in its righmost position shown in FIG. 2. When slide 86 is in its leftmost position, as shown in FIG. 3, spring 200 urges pinch roller arm 196 to rotate counter-clockwise and bring pinch roller 192 into contact with capstan 34.

A brake assembly 208, controlled by movement of various mode change-over slides, (see FIG. 8 as well) is provided for reel mounts 30 and 32. Brake assembly 208 includes brake shoe supports 210, 212 provided with brake shoes 214, 216, respectively, for braking engagement with the circumferential surface of reel mounts 40 and 42, respectively. The brake shoe supports 210, 212 are secured to substantially T-shaped brake levers 218, 220, respectively, which are rotatably supported with respect to chassis 32 on support pins 222, 224. Brake levers 218, 220 are rotatably supported on the respective arm portions 226, 228 of levers 218, 220 by support pins 230, 232, respectively. A second arm portion 234, 236 of each brake lever 218, 220 are formed with facing angled segments 238, 240, respectively, oriented in the same plane. A tension spring 242 is secured between brake shoe levers 218 and 220 below the pivot pins 222 and 224 to urge rotation of brake shoe levers 210, 212 to place brake shoes 214 and 216 into braking contact with reel mounts 40 and 42, respectively, as shown in FIG. 2. In addition tension spring members 244 and 246 are extended between a spring receiving portion 248 of brake lever 218 and a spring receiving portion 250 of brake shoe support 210, and a spring receiving portion 252 of brake lever 220 and a spring receiving portion 254 of brake shoe support 212, respectively. Thus, springs 244 and 246 urge rotation of the brake shoes 214 and 216 in the opposite direction urged by spring 242.

Operating on the brake assembly 208 in response to movement of mode change-over slides 88 and 92 is an L-shaped interconnecting lever 256. The lever 256 includes a first leg 258, having an extending segment 260 adapted to contact the arm portions 234, 236 of brake levers 218, 220, and a second leg 262 adapted to cooperatively engage with mode change-over slides 88 and 92. Interconnecting lever 256 is rotatably mounted to chassis 32 by a support pin 264.

Leg 262 of interconnecting lever 256 includes a projecting tab 266 which extends into a receiving slot 268 (see FIG. 6) in mode change-over slide 88 to abut against a projection 270 within slot 268. Thus, movement of slide 88 to the left, as viewed in FIG. 6, causes lever 256 to pivot bringing leg 258 into contact with arm portions 234, 236 of brake assembly 208 pivoting the brake shoes 214, 216 out of contact with reel mounts 40 and 42, i.e. from the position shown in FIG. 2 to the position shown in FIG. 6.

The end of leg 262 includes a projecting tab 272 engageable with a shoulder segment of the upper edge of mode change-over slide 92 (see FIG. 7). Thus, movement of slide 92 also pivots interconnecting lever 256 to engage and disengage the brake shoes 214, 216 with respect to reel mounts 40 and 42.

Mode change-over slide 84 includes a projecting tab 276 on a lower edge portion which is engageable with spring receiving portion 248 of brake lever 218 (see FIG. 3). Thus, movement of slide 84 from the position shown in FIG. 2 to the position shown in FIG. 3 will pivot only brake shoe 214 out of contact with reel mount 40. In like manner mode change-over slide 86 includes a projecting tab 278 on an upper edge portion which is engageable with brake shoe support 212. As slide 86 moves from the position shown in FIG. 2 to the position shown in FIG. 3 the engagement of this slide with brake shoe support 212 will pivot only brake shoe 216 out of contact with reel mount 42.

Mode operating-slide 90 operates to effect a change from the record mode to the reproduce mode by acting on a switch to electrically change the circuit in apparatus 10. Accordingly, as shown in FIG. 9, a switch operating lever 280 is rotatably supported on chassis 32 by a support pin 282. Lever 280 is urged in the clockwise direction about support pin 282 by a tension spring 284 functioning as a limiter spring extending between one end 286 of switch operating lever 280 and mode change-over slide 90. End 286 of switch operating lever 280 contacts with the end surface 288 of mode change-over slide 90. The other end 290 of switch operating lever 280 contacts the actuating member 292 of a change-over slide switch 294 for electrically switching between the recording and reproducing circuits.

Figure 17:
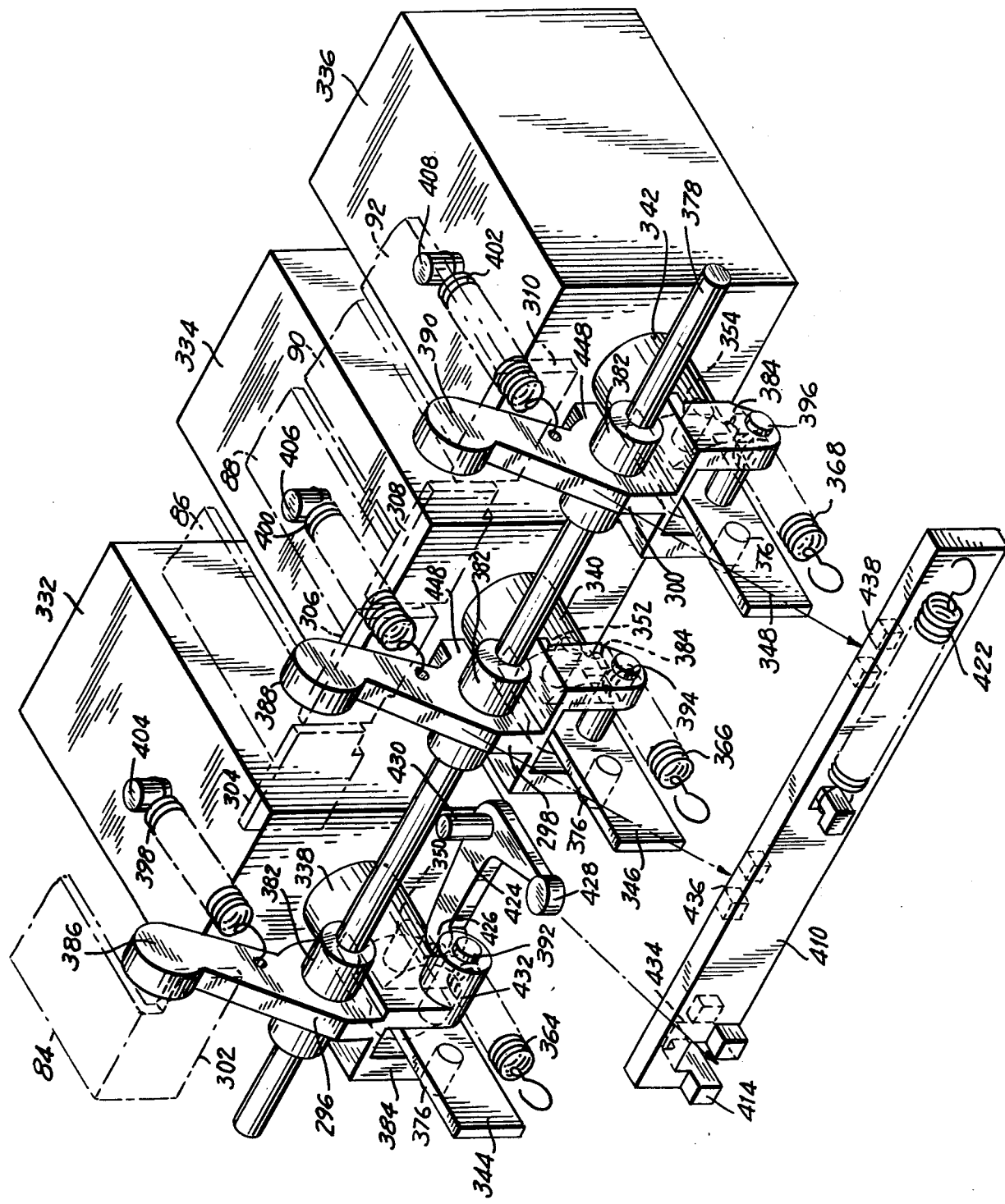
FIG. 17 is a partial perspective view showing the operative mechanism for actuating the mode selecting slides of the present invention.

Movement of mode change-over slides 84-92 are selectively controlled through mode selecting levers 296, 298 and 300 (FIG. 17) which operate on tab projections 302, 304, 306, 308 and 310 of mode change-over slides 84-92, respectively, as will be described more fully hereinafter. As described hereinafter, mode selecting lever 296 exclusively operates mode change-over slide 84, while the remaining mode selecting levers 298 and 300 operate alternatively to drive mode change-over slides 86 and 88, and 90 and 92, respectively.

Before turning to a description of the operation of the mode selecting levers the various modes for apparatus 10 will be described.

Stop mode

FIG. 2 shows the stop mode. A cassette 14 is loaded by loading mechanism 16 at a predetermined position, as shown in dotted line. A tension detecting pin 312 extending from tape tension arm 120, a tape shifter pin 314 extending from tape shifter lever 158 and pinch roller 192 are located at their initial at rest positions behind the magnetic tape 12. Forward idler 44 is separated from take-up reel mount 40 and brake shoes 214 and 216 of brake assembly 208 are pressed to the reel mounts 40 and 42. Thus, the rotation of reel mounts 40 and 42 is precluded. Brake shoe 112 of tension regulating lever 108 is separated from supply reel mount 42. When an appropriate operating mode is selected, electric motor 32 is driven to rotate capstan 34 and the appropriate mode change-over slide moved for the corresponding activation of the drive system.

Reproducing mode

Figure 4:
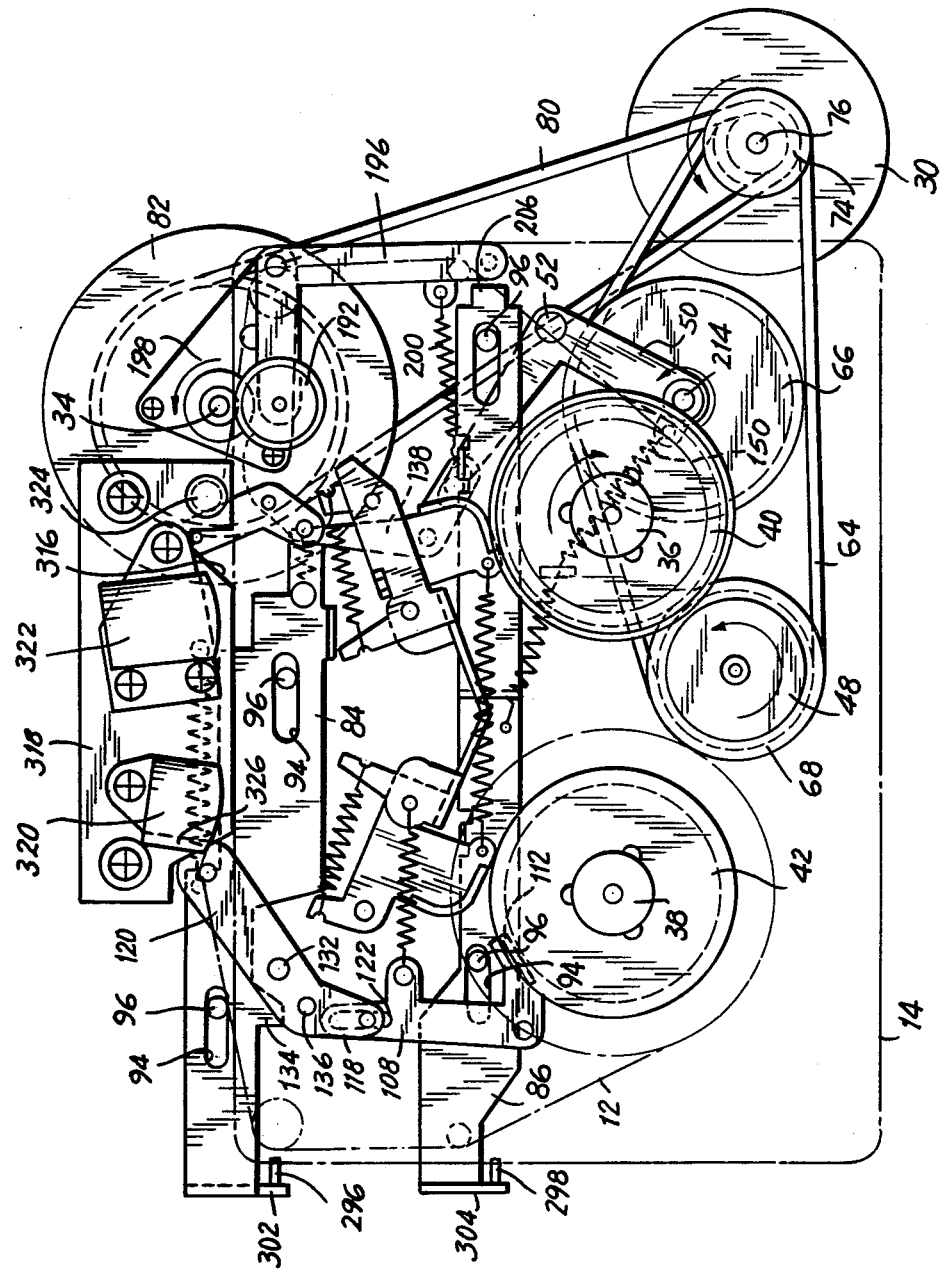
FIG. 4 is a view similar to FIG. 3 showing the mode selecting device of the present invention when the reproducing mode is operative.

FIG. 4 shows the reproducing mode. For example, when the reproducing push button 22 is depressed, reproducing-record selector switch 294 is placed in the correct mode, and apparatus 10 is changed from the stop mode condition shown in FIG. 2 to the reproducing mode shown in FIG. 4.

With the depressing of the reproducing selector button 22, mode change-over slide 84 is moved in the leftward direction against spring 98 by the engagement of tab projection 302 with mode selecting lever 296. After a slight time delay, mode change-over slide 86 is moved in the leftward direction against spring 100 by the engagement of tab projection portion 304 with mode change-over lever 298.

With the leftward movement of mode change-over slide 84, cam projection 134 on slide 84 is separated from pin 132 on tension arm 120. Since tension arm 120 is engaged with tension regulating lever 108 by the engagement of pin 124 in slot 122, the position of arm 120 fixes the position of lever 108. Accordingly, with the removal of constraint to movement on arm 120 tension regulating lever 108 rotates in the clockwise direction under the urging of tension regulating spring 126. Tension arm 120 also rotates in the counter-clockwise direction from the position shown in FIG. 2 to the position shown in FIG. 4. With the counter-clockwise rotation of tension lever 120, tension detecting pin 312 is moved to its operative position outward from the housing of cassette 14. Brake shoe 112 on tension regulating lever 108 is lightly pressed against supply reel mount 42. At the same time, tape shifter lever 158 is rotated in a clockwise direction under the urging of spring 154 and is located at its operative position outward from the housing of cassette 14. Rotation of tape shifter lever 158 is restricted by the engagement of tape shifter pin 314 with a cut-out portion 316 formed in the plate 318 supporting the transducer heads 320, 322. The magnetic tape 12 is withdrawn upwardly from the cassette 14 by tension detecting pin 312 and tape shifter pin 314 and brought into contact with transducer heads 320 and 322. Tape guides 324 and 326 are also provided to insure proper positioning of tape 12 along its predetermined tape path.

With the leftward movement of mode change-over slide 84, idler lever 50 and interconnecting lever 138 are rotated in a counter-clockwise and clockwise direction, respectively, under the urging of spring 150. Accordingly, the forward idler 44 is pressed against take-up reel mount 40. At the same time, spring receiving portion 248 of brake lever 218 is moved by projecting tab 276 on mode change-over slide 84. Thus brake lever 218 is rotated in the counter-clockwise direction against spring 242 and brake shoe 214 is separated from take-up reel mount 40. It should be noted that, since the limiter spring 242 is weaker than the pair of springs 244 and 246, the other brake lever 220 is maintained in the same position as in the stop made, that is with brake shoe 216 against reel mount 42 to preclude the rotation of reel mount 42.

Mode change-over slide 86 is moved leftward slightly later than the movement of the mode change-over slide 84. Movement of slide 84 allows pinch roller arm to rotate in a clockwise direction under the urging of the spring force of spring 200. Thus, pinch roller 192 is moved upward to its operative position to press the magnetic tape 12 to the capstan 34. At the same time, the brake shoe lever 212 is moved by projecting tab 278 on mode change-over slide 86 to rotate brake shoe support 212 in the clockwise direction against spring 242. Accordingly, brake shoe 216 is separated from supply reel mount 42 to allow its rotation.

In the reproducing mode, magnetic tape 12 is withdrawn upwardly from cassette 14 to be loaded at the predetermined tape path, and pressed between the capstan 34 and the pinch roller 192. Brakes 214 and 216 are released from reel mounts 40 and 42 and take-up reel mount 40 is rotated in the direction shown by the arrow in FIG. 4 by the forward idler 44. Tape 12 is transported at its predetermined speed and signals are reproduced from tape 12 through the recording-reproducing magnetic head 322.

During the reproducing mode, the tension of the running magnetic tape 12 is continuously detected by tension detecting pin 312. In response to the tension of the running tape 12, tension arm 120 is rotated either in the clockwise or counter-clockwise directions, so that tension regulating lever 108 is rotated in response to the rotation of arm 120 under the urging of spring 126. Accordingly, brake shoe 112 is pressed against, or separated from, supply reel mount 42. Thus, the tension of the running tape 12 is automatically regulated and maintained constant.

Recording mode

FIG. 3 shows the recording mode, for example, when the reproducing push-button 22 and the record push-button 26 are simultaneously depressed while apparatus 10 is in the stop mode, the apparatus is changed over into the recording mode.

With the simultaneous actuation of the reproducing and record switches, mode change-over slide 84 is moved leftward (FIG. 3), in the same manner as on the change-over into the reproducing mode, and, after a slight time delay, mode change-over slides 86 and 90 are simultaneously moved leftward. As noted above, mode change-over slide 90 is moved leftward by the engagement of tab projection 308 with mode selecting lever 300 against the tension imparted by spring 104. With the leftward movement of mode change-over slide 90, switch operating lever 280 is rotated in the clockwise direction (FIG. 8A) by the spring force of spring 284 and actuating member 292 of change-over slide switch 294 is moved inwardly by end 290 of switch operating lever 280. Thus, change-over slide switch 294 initiates the change from the recording condition to the reproducing condition. All other operations are the same as those described above with respect to the reproducing mode. As tape 12 is transported along its predetermined path at its predetermined speed signals are recorded on magnetic tape 12 through the recording-reproducing magnetic head 322.

Pause mode

Figure 5:
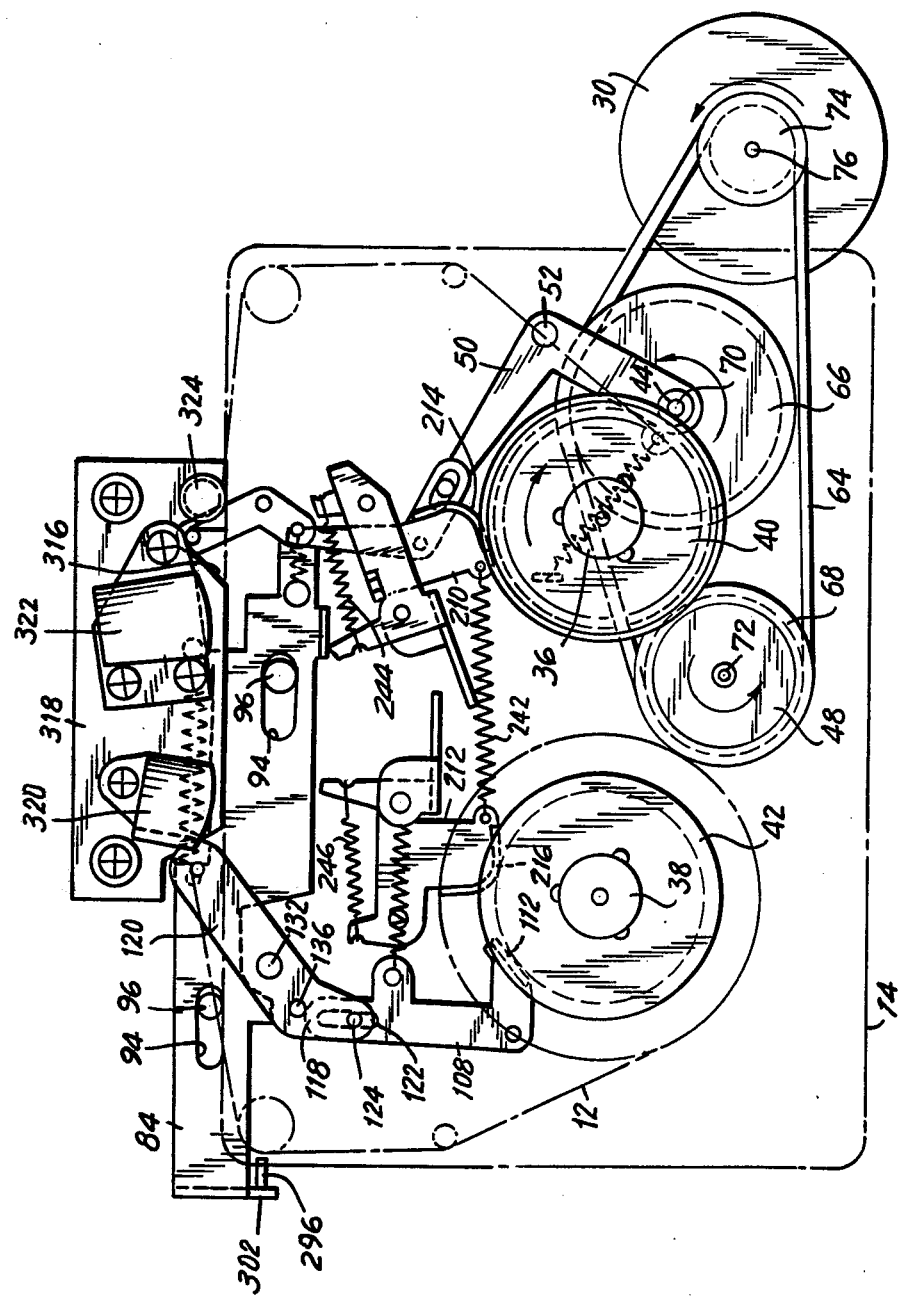
FIG. 5 is a view similar to FIG. 3 showing the mode selecting device of the present invention when the pause mode is operative.

In the pause mode, shown in FIG. 5, magnetic tape 12 is temporarily stopped in either the recording or reproducing mode. The pause mode is obtained by depressing pause push-button 28.

When pause button 28 is activated while apparatus 10 is in the reproducing mode, mode selecting lever 298 (FIG. 4) is returned to its inoperative position and, as a result, mode change-over slide 86 is moved from its leftmost position back to its rightmost position under the urging of spring 100. With the movement of mode change-over slide 86 to the right pinch roller arm 196 is rotated from the position shown in FIG. 3 back to its original at rest position shown in FIG. 2. Thus pinch roller 192 is separated from capstan 34. At the same time, brake shoe support 212 is separated from projecting tab 278 of mode change-over slide 86 and spring 242 urges brake shoe support 212 to rotate in the counter-clockwise direction to press brake shoe 216 against supply reel mount 42.

Thus in the pause mode, tape 12 is not driven by the capstan 34, and supply reel mount 42 is braked so that transport of tape 12 stops. Forward idler 44 is still pressed to take-up reel mount 40 but, as is well known in the art, take-up reel mount 40 is provided with a torque limiter mechanism, such as an overriding clutch, through which reel mount 40 is frictionally driven. Thus, take-up reel shaft 36 cannot be rotated by idler 44.

When the pause button 28 is activated while apparatus 10 is in the recording mode, mode selecting lever 300 is also returned to its inoperative position. Mode change-over slide 90 is released by mode selecting lever 300 and is moved to the right to the position shown in FIG. 2 under the urging of spring 104. Other operations are the same as those described above in the case when the pause button is activated while the apparatus is in the reproducing mode.

Apparatus 10 can also be changed over into the pause mode from the stop mode. In this case, only mode change-over slide 84 is moved to the left by mode selecting lever 296, as shown in FIG. 5. When this occurs, tape 12 is withdrawn from the cassette 14 so as to be loaded at the predetermined position for further operations but tape 12 is not transported.

Fast forward mode

FIG. 6 shows the fast forward mode which is selected by depressing fast forward push-button 24 while apparatus 10 is in the stop mode.

When the fast forward push-button is depressed, mode selecting lever 298 is driven to slide tab projection 306 of mode change-over slide 88 to the left (FIG. 6) against the tension of spring 102. With the leftward movement of mode change-over slide 88 idler lever 60 is rotated in the clockwise direction under the urging of spring 186 thus bringing fast forward idler 48 into contact with take-up reel mount 40. At the same time, projecting tab 266 of interconnecting lever 256 is engaged by projection 270 of mode change-over slide 88 and interconnecting lever 256 is rotated in the clockwise direction. Segment 260 of lever 256 pushes downwardly on arm portions 234 and 236 of brake levers 218 and 220 which rotate in the counter-clockwise and clockwise directions, respectively, against the tension of spring 242. Accordingly, brake shoes 214 and 216 are simultaneously separated from reel mounts 40 and 42.

Thus, in the fast forward mode, reel mounts 40 and 42 are not braked and take-up reel mount 40 is driven at a higher speed in the direction shown by the arrow in FIG. 6 by fast forward idler 48. Tape 12 is transported along the predetermined path at the higher speed.

Rewind mode

FIG. 7 shows the rewind mode which is selected by depressing rewind push-button 18 while apparatus 10 is in the stop mode.

When the rewind push-button is depressed, mode selecting lever 300 is driven to slide tab projection 310 of mode change-over slide 92 to the left (FIG. 7) against the urging of spring 106. With the leftward movement of mode change-over slide 92, idler lever 56 is rotated in the clockwise direction by the spring force of spring 164. Accordingly, swing arm 54 is moved downwardly along the edge of opening 172 and rewind idler 46 carried by arm 54 is pressed between supply reel mount 42 and fast forward idler 48. At the same time, tab projection 272 of interconnecting lever 256 is engaged by shoulder segment 274 of mode change-over slide 92 to rotate interconnecting lever 256 in the clockwise direction. Segment 260 of lever 256 pushes downwardly on arm portions 234 and 236 of brake levers 218 and 220 which, as noted above in the discussion of the fast forward mode, separate the brake shoes 214 and 216 from reel mounts 40 and 42.

Stop Mode from Any Other Operating Mode

For the change-over into the stop mode from any of the above described operating modes, stop push-button 20 is depressed and all of the mode selecting levers 296, 298 and 300 are moved back to their original at rest positions to release all of the mode change-over slides 84–92. Thus, the mode change-over slides 84–92 are moved back to their rightmost positions shown in FIG. 2.

When apparatus 10 is placed in the stop mode from the reproducing mode, the following operations occur.

With actuation of the stop push-button, mode selecting lever 298 is moved to release mode change-over slide 86 and slide 86 moves to the position shown in FIG. 2. After a slight time delay, mode selecting lever 296 is moved to release mode change-over slide 84 so slide 84 can return to the position shown in FIG. 2.

With the return movement of mode change-over slide 86, pinch roller 192 is separated from capstan 34 and, at the same time, brake shoe 216 is pressed against supply reel mount 42, as occurs in the pause mode. Brake shoe 216 applies a strong braking force to supply reel mount 42. This is so because the direction of rotation of reel mount 42 is in the same direction as the pivoting movement of brake shoe 216 to effect a squeezing engagement between supply reel mount 42 and the brake shoe. Therefore, the supply reel is instantaneously stopped as soon as brake shoe 216 is engaged with the reel mount.

Mode change-over slide 84 is moved back after a slight time delay after mode change-over slide 86. As slide 84 moves, pin 132 on tension arm 120 is engaged by cam projection 134 on mode change-over slide 84. Thus, tension arm 120 is forced to rotate in the clockwise direction against the tension regulating spring 126 until it reaches its original position shown in FIG. 2. At the same time, pin 156 of tape shifter lever 158 is forced, by end 162 of mode change-over slide 84, to rotate, in the counter-clockwise direction, to the position shown in FIG. 2.

With the return of mode change-over slide 84 to its at rest position (FIG. 2), tab projection 276 on mode change-over slide 84 is separated from spring receiving portion 248 of brake lever 218. Accordingly, brake lever 218 rotates in the clockwise direction under the urging of spring 242 to press brake shoe 214 against take-up reel mount 40. Brake shoe 214 imparts a relatively light braking force on take-up reel mount 40. This is so because the direction of rotation of take-up reel mount 40 is opposite to the direction of pivoting movement of brake shoe 214. Thus a lighter braking force is applied. Immediately after the clockwise rotation of brake lever 218, interconnecting lever 138 is engaged by pin 152 on mode change-over slide 84, and is rotated in the clockwise direction. Accordingly, idler lever 50 is rotated in the counter-clockwise direction against spring 150 to separate forward idler 44 from engagement with take-up reel mount 40.

The time delay for sequential operation of apparatus 10 will now be discussed. At the same time as pinch roller 192 is separated from capstan 34, supply reel mount 42 is braked to stop the supply of tape 12. Subsequently, tension detecting pin 312 and tape shifter pin 314 are moved back to their original at rest positions (FIG. 2). Thus tape 12 previously held in the predetermined tape path removed from cassette 14 is loosened. Since forward idler 44 is still engaged against take-up reel mount 40, take-up reel mount 40 continues to rotate to take up the loosened tape 12. After the loosened tape has been wound onto the take-up reel in cassette 14, take-up reel mount 40 is braked, and forward idler 44 is separated from its engagement with take-up reel mount 40.

When apparatus 10 is changed over into the stop mode from the recording mode, the operation is in the same manner as in above described case with reference to a charge from the reproducing mode.

Reference is now made to FIGS. 10 to 17 for a description of the sub-assembly 328 to effect selected operating modes for apparatus 10.

Sub-assembly 328 includes a subsidiary chassis 330 which is mounted behind chassis 32 and slightly to the left, as viewed in FIG. 2. Three plunger-solenoids 332, 334 and 336 are positioned so as to be spaced from each other and are secured to the subsidiary chassis 330. While plunger-solenoids 332, 334 and 336 are shown as being arranged laterally in FIGS. 10–12 and 15, the actual physical arrangement is in parallel array spaced from chassis 32 so that solenoids 332, 334 and 336 are arranged vertically in apparatus 10 with the righthand plunger-solenoid 332 being located at the uppermost position and the lefthand plunger-solenoid 336 being located at the lowermost position.

Figure 13:
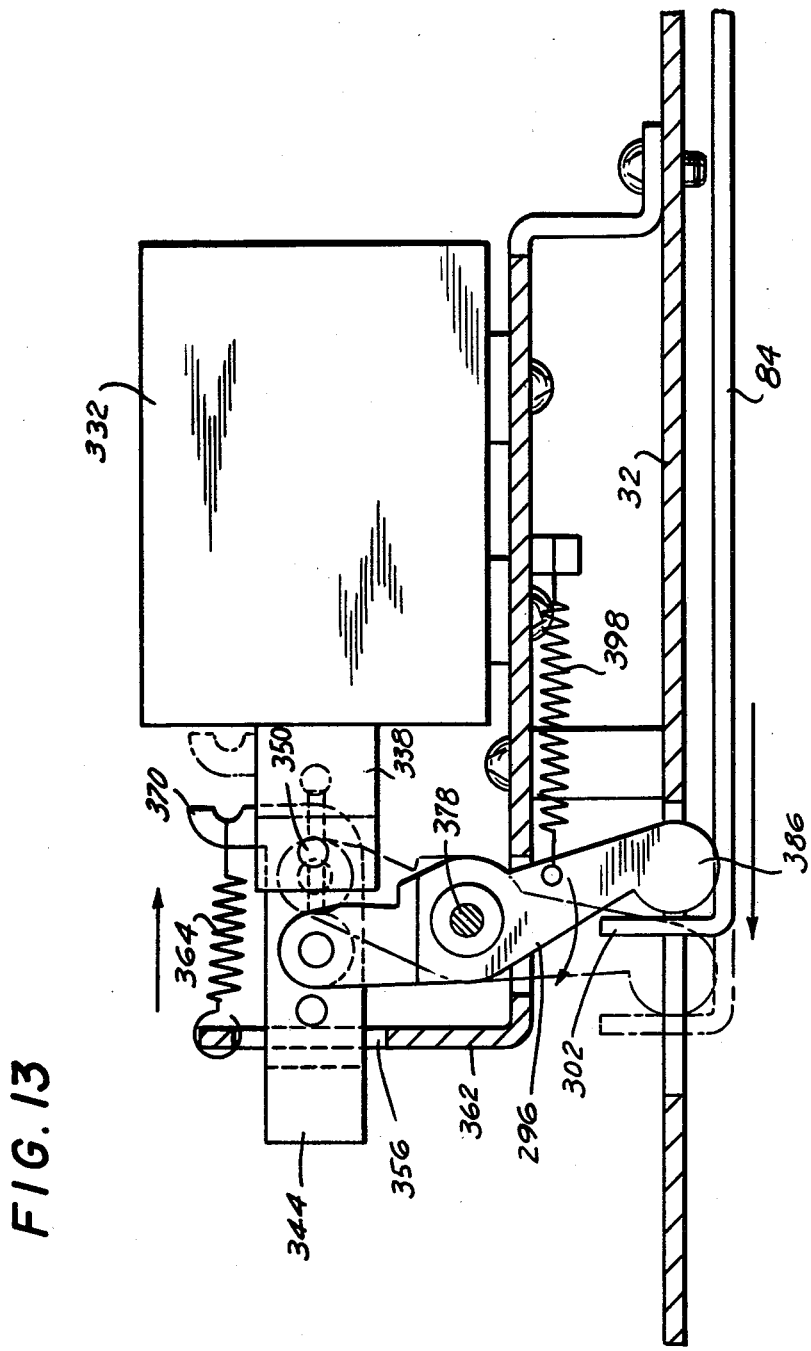
FIG. 13 is a sectional view taken along line 13—13 of FIG. 10.
Figure 14:
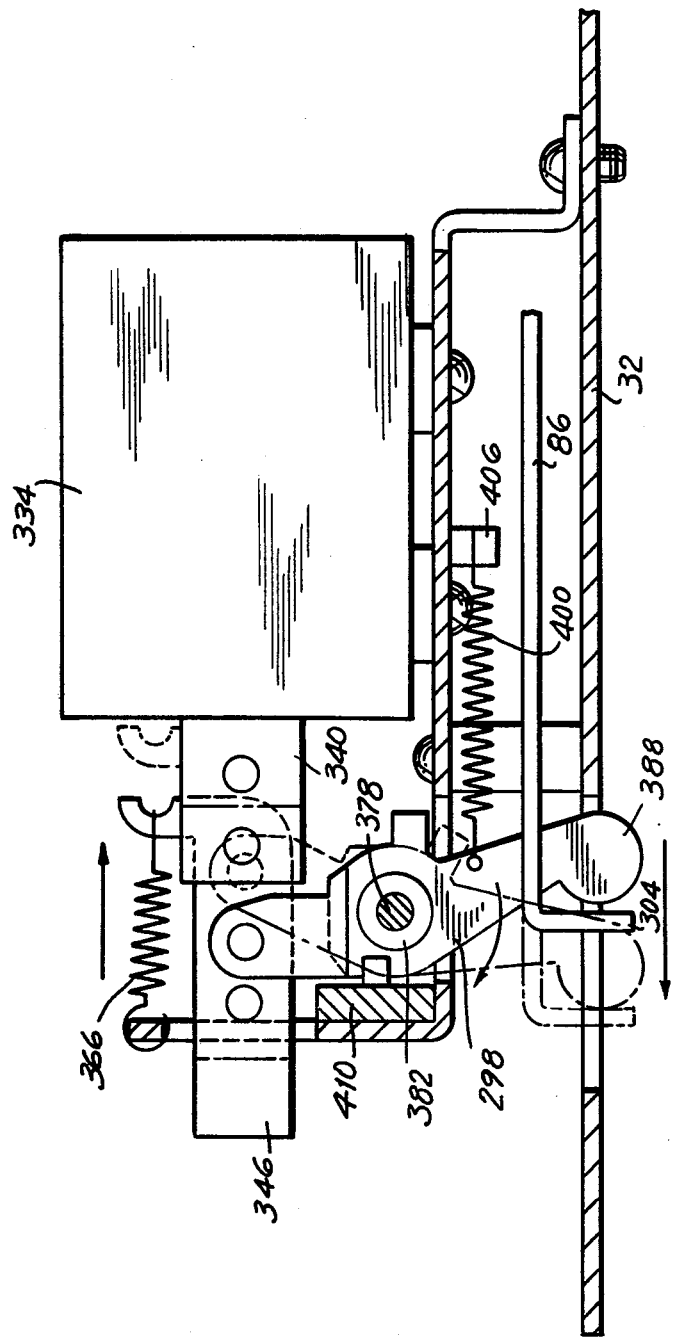
FIG. 14 is a sectional view taken along line 14—14 of FIG. 10.
Figure 16:
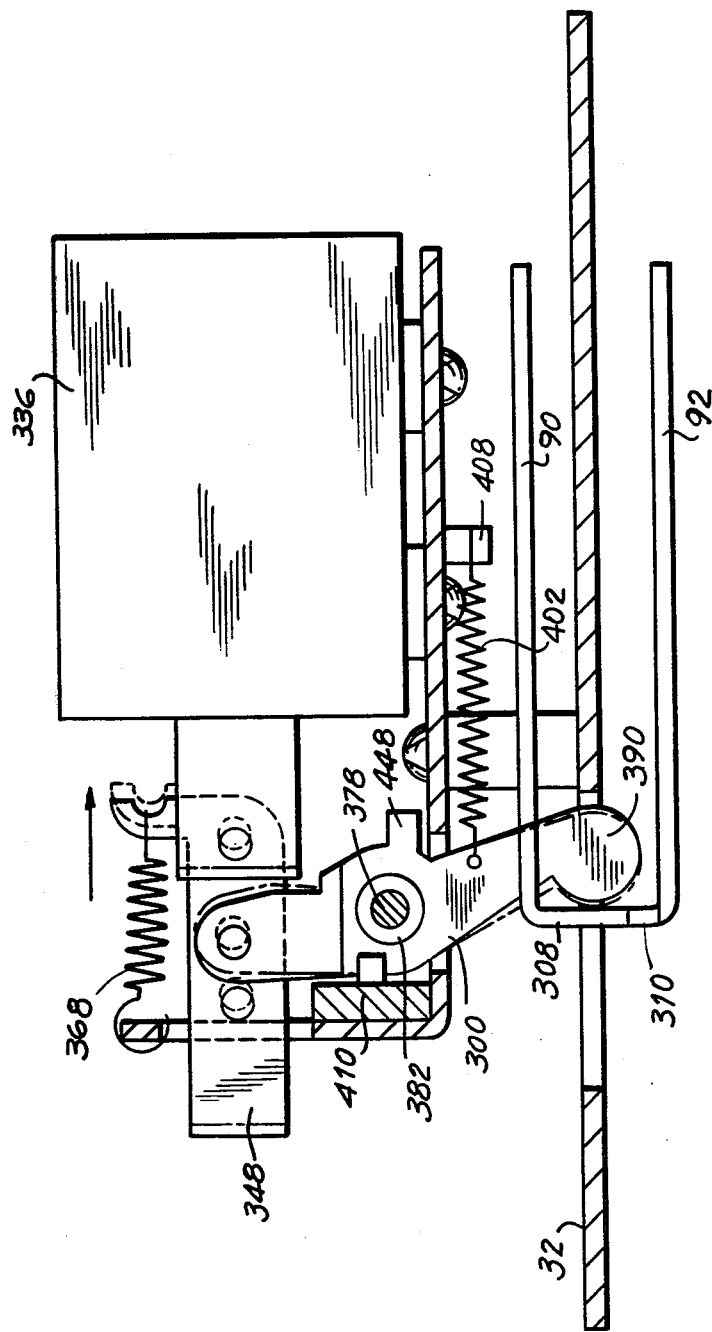
FIG. 16 is a sectional view taken along line 16—16 of FIG. 15.

Each of the plunger-solenoids 332, 334 and 336 include reciprocating plunger members 338, 340 and 342, respectively, adapted to extend from and retract into the respective solenoids upon appropriate electrical energization and deenergization of the solenoid. Connecting plate members 344, 346 and 348, respectively, are secured within a slot in the end of each plunger 338, 340 and 342 by securing pins 350, 352 and 354. The ends of connecting plates 344, 346 and 348 are free to pass through slots 356, 358 and 360, respectively, in an extending flange portion 362 of subsidiary chassis 330. As best seen in FIGS. 13, 14 and 16, tension springs 364, 366 and 368 are provided and extend between spring mounts 370, 372 and 374 formed integrally with connecting plates 344, 346 and 348, respectively, and flange portion 362 of subsidiary chassis 330 to urge the plungers 338, 340 and 342 toward flange portion 362. A stop pin 376 is provided on each connector plate 344, 346 and 348 and extends outwardly from the plate to form an abutment to contact the surface of flange portion 362 when the respective plunger is in its extended position. Thus stop pin 376 fixes the maximum extension of the respective plungers.

A guide shaft 378 which functions as a support shaft as well is supported within side flange extensions 380 formed integrally with the subsidiary chassis 330. Mode selecting levers 296, 298 and 300 are rotatably supported on guide shaft 378 with shaft 378 passing through a boss segment 382 formed on each lever.

The Lower segment of each lever 296, 298 and 300 includes a U-shaped segment 384 which is positioned to straddle the respective connecting plates 344, 346 and 348. Mode selecting lever 296 is rotatably mounted on guide shaft 378 while mode selecting levers 298 and 300 are rotatably and slidably mounted on guide shaft 378. Thus the width between the legs of U-shaped segment 384 on the mode selexting levers 298 and 300 is greater than the width of mode selecting lever 296 to accommodate the movement of levers 298 and 300 along shaft 378.

The upper end 386 of mode selecting lever 296 is so designed as to be engageable with projecting tab 302 of mode change-over slide 84. The upper ends 388 and 390 of mode selecting levers 298 and 300, respectively, are so designed as to be alternatively engageable with tab projections 304 and 306 of mode change-over slides 86 and 88, and tab projections 308 and 310 of mode change-over slides 90 and 92, respectively.

Connecting plates 344, 346 and 348 are inserted within U-shaped portions 384 of mode selecting levers 296, 298 and 300, and are interconnected by pins 392, 394 and 396. Tension springs 398, 400 and 402 are provided to extend between spring mounts 404, 406 and 408 fixed on subsidiary chassis 330 and mode selecting levers 296, 298 and 300, respectively, to urge the levers to rotate about shaft 378.

A selection slide 410 is provided to shift mode selecting levers 298 and 300 along guide shaft 378. Slide 410 is positioned for sliding movement along the inner surface of flange portion 362 of subsidiary chassis 330. A first slot 412 is provided in flanged portion 362 to accommodate spaced projections 414 on slide 410 and a second slot 416 is provided in flanged portion 362 to accommodate a spring mounting projection 418 on slide 410. In addition, a slot 420 is provided in flange extension 380 to permit sliding movement of slide 410 relative to subsidiary chassis 330. Movement of slide 410 along subsidiary chassis 330 is limited by the engagement of projections 414 with the ends of slot 412. Slide 410 is also biased by a tension spring 422 extended between spring mount 418 and subsidiary chassis 330.

Movement of slide 410 is affected through a substantially L-shaped interconnecting lever 424 having leg segments 426 and 428 and being rotatably mounted at the junction of legs 426 and 428 by a support pin 430 extending from subsidiary chassis 330. The end of leg 426 contacts a projecting boss 432 on U-shaped portion 384 of mode selecting lever 296 while the end of leg 428 of interconnecting lever 424 is engaged within a receiving groove 434 on selection slide 410. Receiving grooves 436 and 438 are also provided on slide 410 to respectively engage mode selecting levers 298 and 300. Thus movement of slide 410 will move mode selecting levers 298 and 300 between the tab projections of the mode change-over slides.

Figure 15:
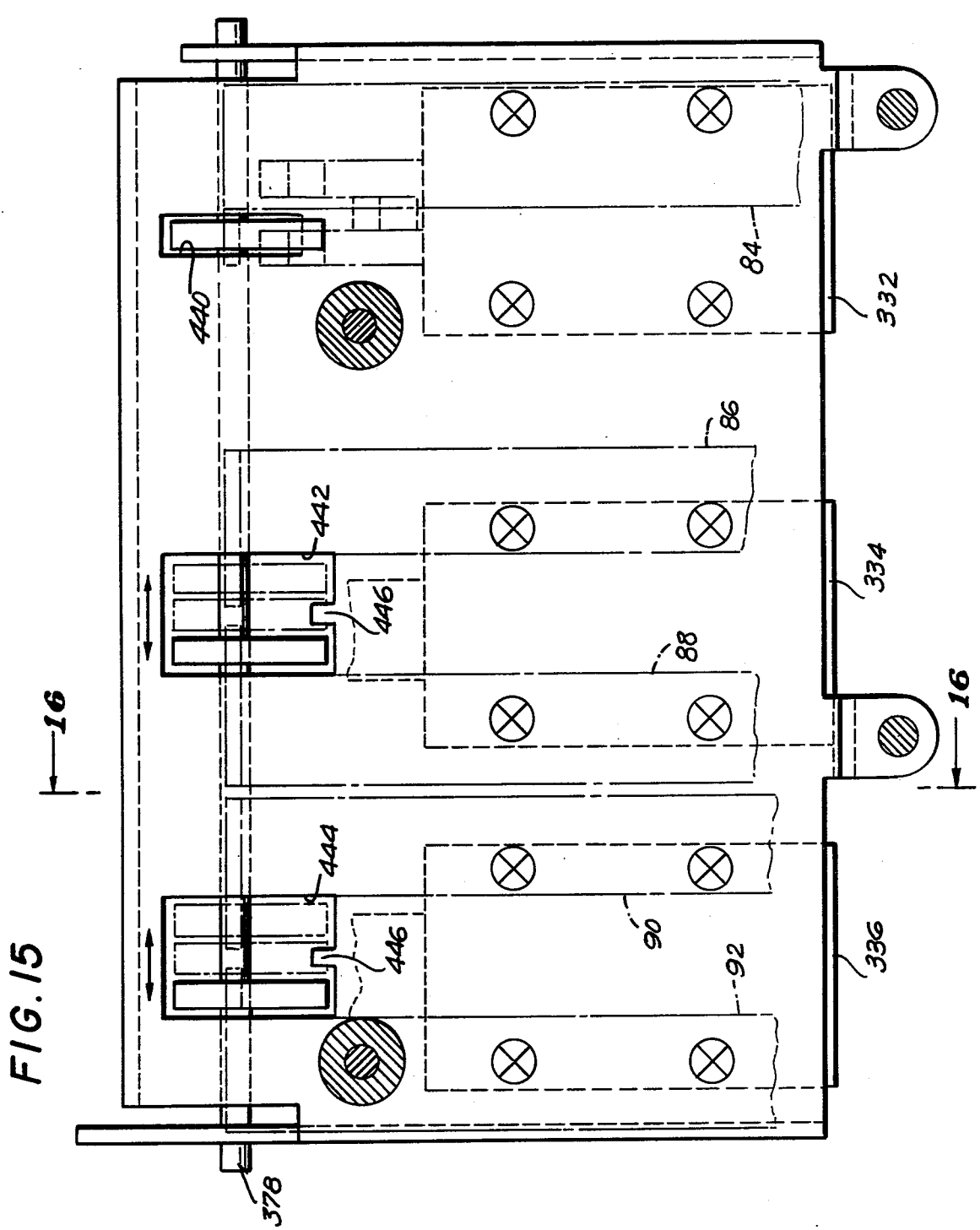
FIG. 15 is a view similar to FIG. 10 but taken from the opposite side of FIG. 10.

As best seen in FIG. 15, three openings 438, 440 and 442 are provided in subsidiary chassis 330 to accommodate mode selecting levers 296, 298 and 300, respectively. Note that openings 440 and 442 are wider than opening 438 to accommodate the lateral movement of mode selecting levers 298 and 300. Openings 440 and 442 also include a protuberance 446 at the mid-section of the openings and that mode selecting levers 298 and 300 include a projection 448 which acts as a stop as it contacts protuberance 446 where levers 298 and 300 are centrally positioned in openings 442 and 444 to prevent rotation of mode selecting levers 298 and 300.

Thus, mode selecting sub-assembly 328 controls the five mode change-over slides 84–92 to selectively position these slides for the various operative modes of apparatus 10 by the selective energization of the three plunger-solenoids 332, 334 and 336.

Stop Mode

Figure 10:
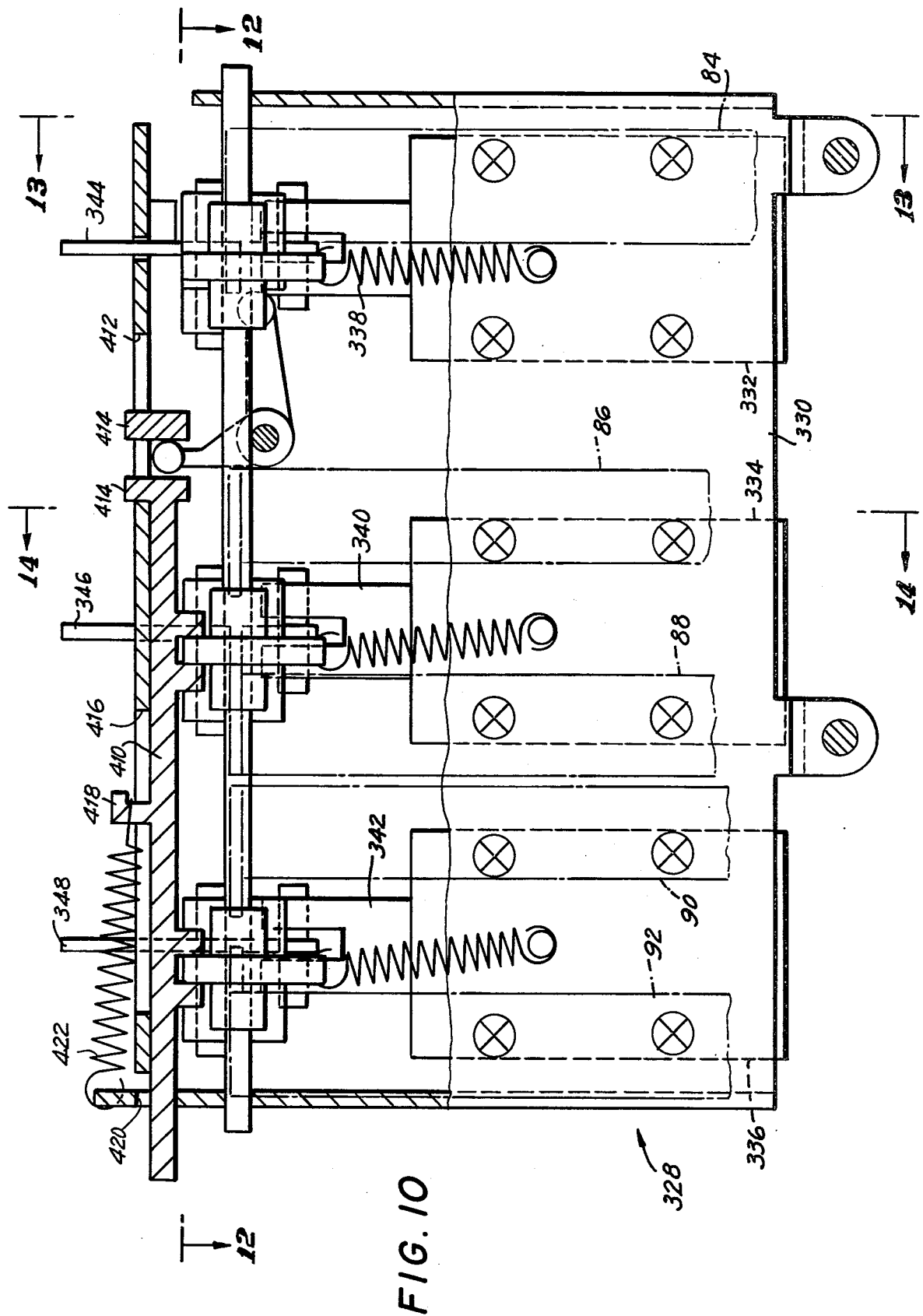
FIG. 10 is an elevational view partly in sections showing details of driver mechanism of the mode selecting device of the present invention.
Figure 11:
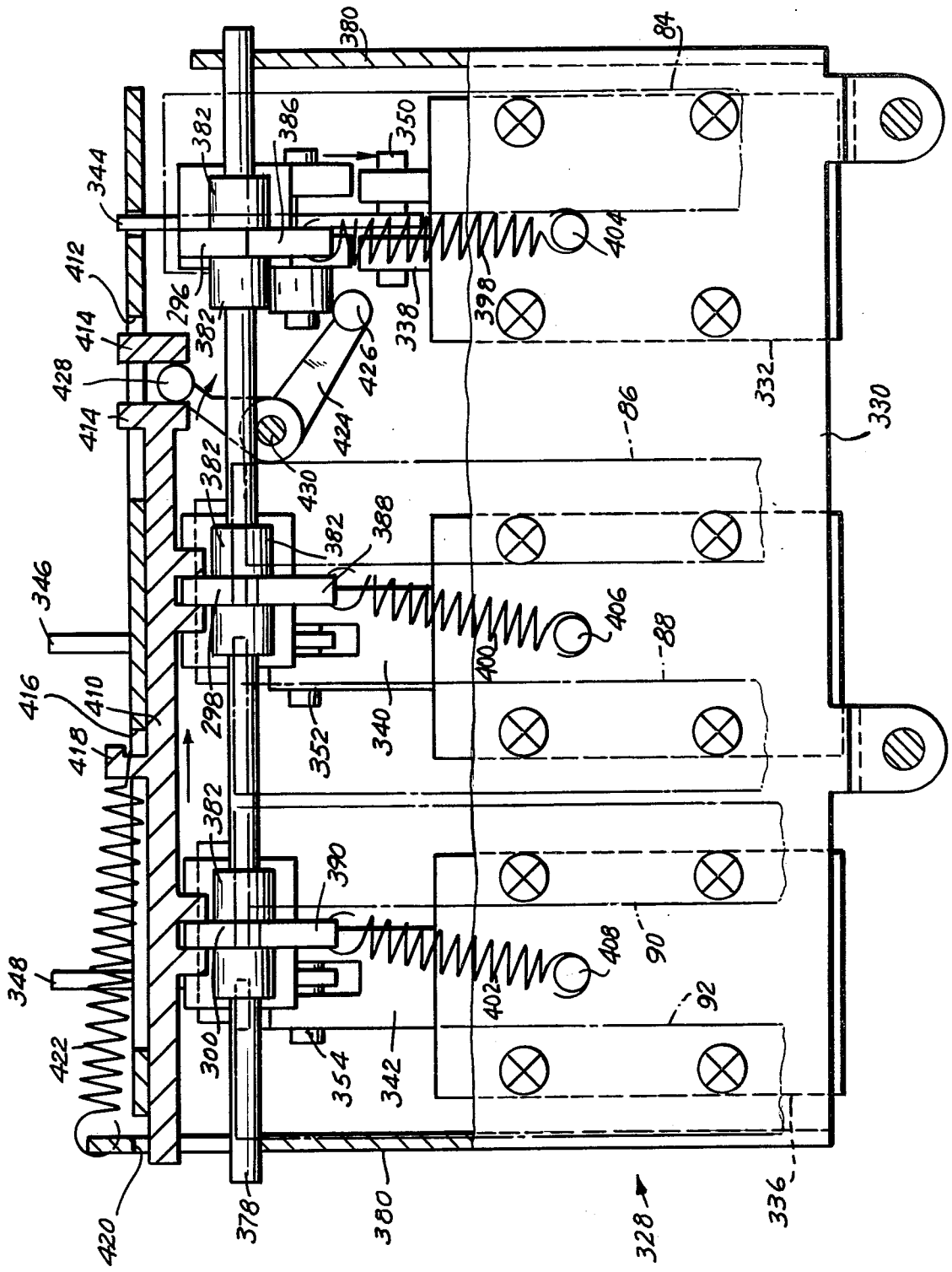
FIG. 11 is a view similar to FIG. 10 showing the mechanism in a second position of operation.

Plunger soldenoids 332, 334 and 336 are deenergized for the stop mode. As shown in FIG. 10, selection slide 410 is located at its original at rest position to the extreme left, as viewed in FIG. 10, by restoring spring 422. Since mode selecting levers 298 and 300 are engaged within receiving grooves 436 and 438 of selection slide 410, mode selecting levers 298 and 300 are located at their lowermost positions along the guide shaft 378. Accordingly, upper ends 388 and 390 of mode selecting levers 298 and 300 are in contact with tab projections 306 and 310 of mode change-over slides 88 and 92, respectively, and all of the mode change-over slides are in the position shown in FIG. 2.

Reproducing Mode

When apparatus 10 is placed in the reproducing mode, electric current is first supplied to plunger-solenoid 332 to energize the solenoid. With the energization of plunger-solenoid 332, connecting plate 344 is pulled rightward (FIG. 13), as plunger 338 is retracted, against the tension of springs 364 and 398 to rotate mode selecting lever 296 in the clockwise direction, as viewed in FIG. 13. Accordingly, tab projection 302 of mode change-over slide 84 is engaged and moved by end 386 of mode selecting lever 296. Thus, mode change-over slide 84 is moved from the position shown in FIG. 2 to the position shown in FIG. 4. At the same time, leg 426 of interconnecting lever 424 is pushed by boss portion 432 of mode selecting lever 296, as plunger 338 retracts, to rotate interconnecting lever 424 in a clockwise direction, as viewed in FIG. 17. Rotation of lever 424, since leg 428 is engaged with slide 410, moves selection slide 410 against spring 422. Thus, mode selection levers 298 and 300, linked to slide 410 through receiving grooves 436 and 438, are moved along guide shaft 378 so that ends 388 and 390 of mode selecting levers 298 and 300 are moved into contact with tab projections 304 and 308 of mode change-over slides 86 and 90, respectively.

When plunger-solenoid 334 is energized after a slight time delay after the energization of plunger-solenoid 332, connecting plate 346 is pulled rightward, as viewed in FIG. 14, by the retraction of plunger 352 against spring 366. Thus, mode selecting lever 298 is rotated in the clockwise direction by connecting plate 346 against spring 400. Tab projection 304 of mode change-over slide 86 is engaged and moved by end 388 of mode selecting lever 298 and mode change-over slide 86 is moved leftward as described with reference to FIG. 2.

Recording Mode

When apparatus 10 is placed in a recording mode, electric current is first supplied to plunger-solenoid 332 to energize the solenoid in the same manner as described for the reproducing mode. After a slight time delay, electric current is supplied to plunger-solenoids 334 and 336 to simultaneously energize these solenoids.

With the energization of the plunger-solenoid 336, connecting plate 348 is pulled to the right, as viewed in FIG. 16, by plunger 354 against spring 368 and mode selecting lever 300 is rotated in the clockwise direction against spring 402. Tab projection 310 of mode change-over slide 90 is moved by end 390 of mode selecting lever 300 to move mode change-over slide 90 to the left as described with reference to FIG. 2. The remaining operations are the same as that described for the reproducing mode.

Pause Mode

For the pause mode in which the magnetic tape 12 is temporarily stopped in the recording or reproducing mode, plunger-solenoid 332 is energized, while plunger-solenoids 334 and 336 are deenergized.

With the deenergization of the plunger-solenoids 334 and 336, mode selecting levers 298 and 300 and connecting plates 346 and 348 are returned to their original positions under the urging of springs 366, 368, 400 and 402. Accordingly, mode change-over slides 86 and 90 are moved back to the right to their original positions as shown in FIG. 2.

When apparatus 10 is placed in the pause mode from the stop mode, only plunger-solenoid 332 is energized and the operation is the same as that described above for the reproducing mode.

Fast Forward Mode

When apparatus 10 is placed in the fast forward mode, plunger-solenoid 332 is not energized and only plunger-solenoid 334 is energized. Since solenoid 332 is not energized, selection slide 410 is not moved. Thus, mode selecting lever 298 is located at its lower position, i.e. at its leftward position as viewed in FIGS. 12 and 15. Accordingly, when mode selecting lever 298 is rotated in the clockwise direction, FIG. 14, with the energization of plunger-solenoid 334, tab projection 306 of mode change-over slide 88 is engaged and moved by end 388 of mode selecting lever 298 and mode change-over slide 88 is moved to the left as shown in FIG. 2.

Rewind Mode

When apparatus 10 is placed in the rewind mode, plunger-solenoid 332 is not energized and only plunger-solenoid 336 is energized. As described above with respect to the fast forward mode, selection slide 410 is not moved, and, thus mode selecting lever 300 is located at its lower position, i.e., at its leftward position, as viewed in FIGS. 12 and 15). Accordingly, when mode selecting lever 300 is rotated with the energization of plunger-solenoid 336, tab projection 310 of mode change-over slide 92 is moved by end 390 of mode selecting lever 300. Thus, mode change-over slide 92 is moved to the left to the position shown in FIG. 2.

In the above described mode selecting mechanism, both of the mode selecting levers 298 and 300 must be accurately located with respect to mode change-over slides 86 and 88, and 90 and 92, respectively, in order to selectively move these slides. If mode selecting levers 298 and 300 are unexpectedly located, for example, at the positions shown by the dot-dash lines of FIG. 15, provision must be made to prevent rotation of 298 and 300.

Accordingly, in the apparatus 10 according to this invention, mode selecting levers 298 and 300 are prevented from rotating with the energization of plunger-solenoids 334 and 336, when mode selecting levers 298 and 300 are erroneously positioned between the desired positions. Thus, when these levers are positioned, as shown by the dot-dash lines of FIG. 15, and plunger-solenoids 334 and 336 are energized, projections 448 on mode selecting levers 298 and 300 come into contact with protuberances 446 formed in opendings 442 and 444 of subsidiary chassis 330 to prevent rotation of mode selecting levers 298 and 300.

Figure 18:
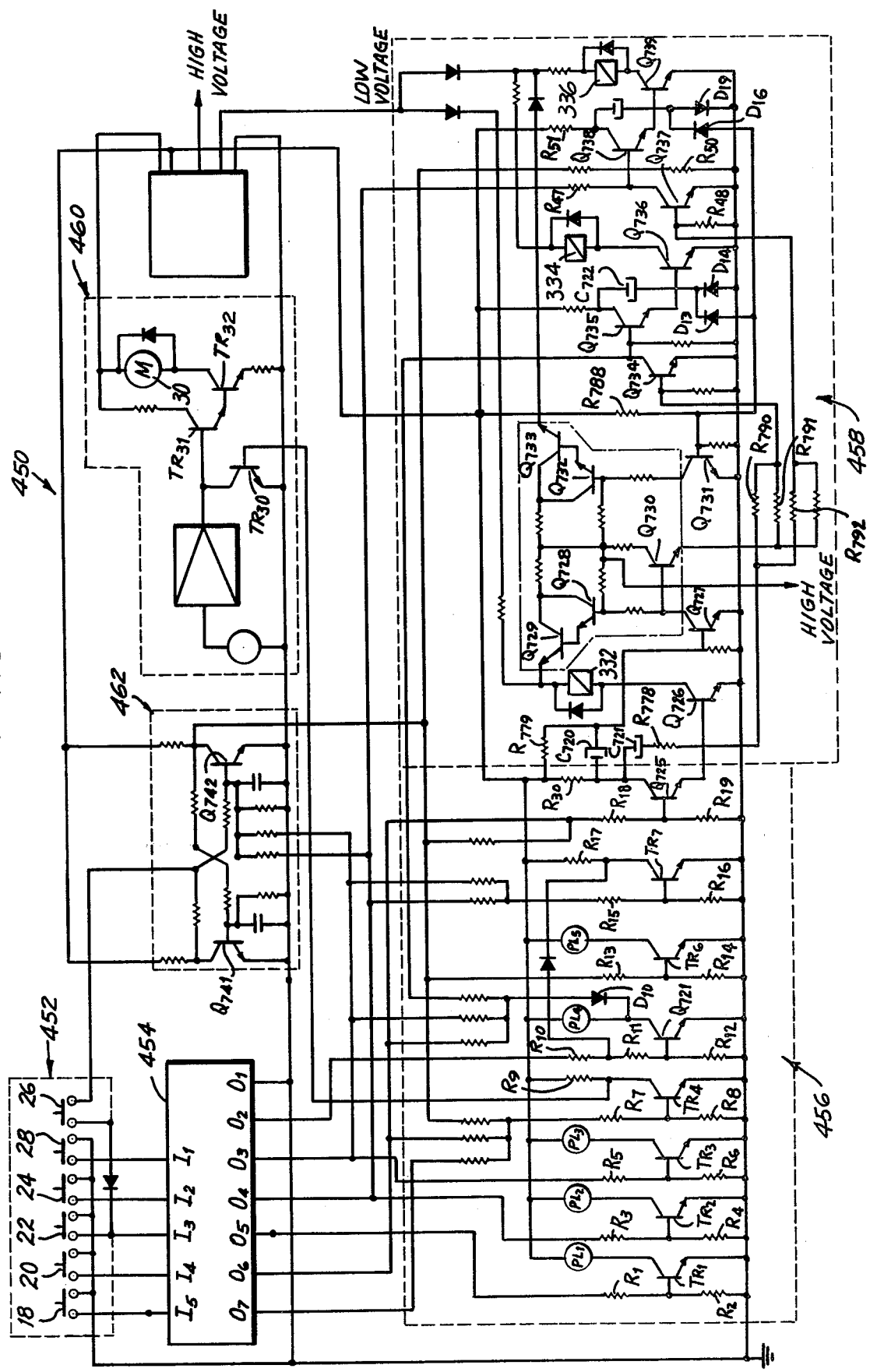
FIG. 18 is a block circuit diagram showing the control circuit for the mode selecting device of the present invention.

FIG. 18 shows a system control circuit 450 for apparatus 10 including the control circuit for plunger-solenoids 332, 334 and 336 which are selectively energized and deenergized responsive to selection of an appropriate operating mode. Control circuit 450 includes a switch circuit 452 comprising the push buttons 18, 20, 22, 24, 26 and 28 for selecting the rewind, stop, reproduce or playback, fast forward, pause and recording modes, respectively, for apparatus 10. Also included is an integrated circuit 454, with inputs $I_1$-$I_5$ and outputs $O_1$-$O_7$, an indicating circuit 456 to light pilot lamps $PL_1$-$PL_5$, a plunger driving circuit 458 to selectively energize the plunger-solenoids 332, 334 and 336, a motor control circuit 460 and a flip-flop circuit 462 to control selection of the record or reproduce modes, as described above.

In operation, when any of the push buttons 18-28 are pressed, the corresponding input to IC454 is grounded with the output produced at the output ($O_1$-$O_7$) to control the relevant section. Table 1 below shows the logic values of the various outputs of IC circuit 454. "0" means no output, i.e., 0V. while "1" indicates a 12V. output. HOLD during the pause mode means there is no change to the previous status.

Table 1

| Output | Stop $O_7$ | Delay Forward $O_6$ | Forward $O_5$ | Rewind $O_4$ | Fast Forward $O_3$ | Pause $O_2$ |
|---|---|---|---|---|---|---|
| Mode |  |  |  |  |  |  |
| Stop | 0 | 0 | 0 | 0 | 0 | 0 |
| Forward | 1 or 0 | 1 | 1 | 0 | 0 | HOLD |
| Fast Forward | 1 | 0 | 0 | 0 | 1 | HOLD |
| Rewind | 1 | 0 | 0 | 1 | 0 | HOLD |
| Forward to Pause | 1/0 | 1 | 1 | 0 | 0 | 0/1 |

$O_6$ terminal of IC 454 is the delay forward terminal. If forward mode is selected during the fast forward or rewind mode, an output is produced at $O_6$ later than the forward signal. The last line of table 1 indicates that if pause is selected during any forward mode an output is produced to activate the brake control solenoids to apply the brakes and stop tape transport.

Table 2 below indicates the energized state of the three solenoids 332, 334 and 336 during the indicated modes. "O" indicates energized and "X" indicates deenergized.

Table 2

| Mode | Stop | Reproduce | Fast Forward | Rewind | Pause | Record | Record to Pause or Reproduce to Pause |
|---|---|---|---|---|---|---|---|
| Solenoid |  |  |  |  |  |  |  |
| 332 | X | O | X | X | O | O | O |
| 334 | X | O | O | X | X | O | X |
| 336 | X | X | X | O | X | O | O |

The plunger driving circuit includes a solenoid kick circuit to avoid unnecessary heat generation during normal solenoid operation. During stop of forward mode, $Q_{731}$ is ON by a signal applied from a 6V. line through $R_{788}$. However, during a forward mode, $Q_{735}$ is turned ON by a signal from IC 454 and capacitor $C_{722}$ is discharged. This turns $Q_{731}$ OFF and the solenoids 332, 334 and 336 are driven by the high voltage from $Q_{733}$. If $C_{722}$ is charged up again from the 6V. line, $Q_{731}$ will again turn ON and the solenoids will be energized by the low voltage. The same situation occurs with respect to $Q_{738}$ and $C_{723}$.

The following description applies to the indicated mode changes with respect to the control circuit, FIG. 18.

Stop Mode to Reproduce Mode

In going to the reproduce mode, as seen in Table 2, solenoids 332 and 334 are energized with solenoid 334 to be energized at a time delay after energization of solenoid 332. Thus, upon pressing reproduce button 22 the delay forward signal from output $O_6$ of IC 454 is applied to the base of $Q_{725}$ and $Q_{735}$. $Q_{725}$ and $Q_{726}$ are thus turned ON to energize solenoid 332. When $Q_{725}$ and $Q_{726}$ are both ON, $C_{720}$ discharges and the base voltage on $Q_{727}$ is decreased so that $Q_{727}$ turns OFF. This turns $Q_{728}$ and $Q_{729}$ ON and solenoid 332 is energized by the high voltage while $C_{720}$ discharges.

During this period, $Q_{730}$ turns ON and then $Q_{734}$ turns ON by a base current flowing through $R_{791}$. Thus, the delay forward signal applied to the base of $Q_{735}$ from terminal $O_6$ of IC 454 is grounded at $Q_{734}$. This turns $Q_{735}$ and $Q_{736}$ OFF so that solenoid 334 is not energized. Another base current is applied to $Q_{734}$ via the line through $R_{791}$. After discharging $C_{720}$, $Q_{727}$ turns ON to thus turn OFF $Q_{728}$, $Q_{729}$, $Q_{730}$ and $Q_{734}$. This turns $Q_{735}$ and $Q_{736}$ ON to energize solenoid 334. With both solenoids 332 and 334 energized, the apparatus is placed in a forward reproduce mode.

Stop Mode to Fast Forward or Rewind Mode

When the fast forward signal is applied from output $O_3$ of IC 454 it is applied to the base of $Q_{735}$. This turns $Q_{735}$ and $Q_{736}$ ON to energize solenoid 334, see Table 2, which places the apparatus in the fast forward mode. To place the apparatus in a rewind mode, a signal from terminal $O_4$ of IC 454 is applied to turn $Q_{738}$ and $Q_{739}$ ON. This energized solenoid 336 and places the apparatus in a rewind mode.

Stop Mode to Record Mode

When the record push button 26 is pressed, the record control signal is applied to the base of $Q_{725}$ and $Q_{738}$ from the flip-flop circuit 462. This turns $Q_{725}$ and $Q_{726}$ ON to energize solenoid 332. As in the operation described above for stop mode to reproduce mode, $Q_{737}$ is turned ON by a base current applied to it via the line through $R_{792}$. This turns $Q_{738}$ and $Q_{739}$ ON after solenoid 332 has been energized to energize solenoid 336. Energizing solenoids 332 and 336 places the apparatus in a "stand by" mode to remove the apparatus from the "stand by" mode, the record and reproduce buttons are simultaneously pushed and a delay forward signal from $O_6$ of IC 454 is applied to the base of $Q_{735}$ so that $Q_{735}$ and $Q_{736}$ turn ON to energize solenoid 334. With all three solenoids energized, the apparatus is in the record mode.

Record Mode to Pause Mode

When pause button 28 is pressed, the pause signal from $O_2$ of IC 454 is applied to the base of $Q_{721}$ turning it ON. The base of $Q_{735}$ is grounded so that $Q_{735}$ and $Q_{736}$ turn OFF to deenergize solenoid 334 to place the apparatus in the pause mode.

Record Mode to Fast Forward or Rewind Mode

When changing directly to the fast forward mode from the record mode, $Q_{725}$ and $Q_{726}$ turn OFF and the charge up current of $C_{721}$ is applied to the base of $Q_{734}$ via $R_{778}$ and $R_{790}$ while $C_{721}$ is charged up. $Q_{734}$ turns ON and the fast forward signal from $O_3$ of IC 454 is temporarily grounded. $Q_{734}$ turns OFF after $C_{721}$ is fully charged so that the fast forward signal from $O_3$ of IC 454 energizes solenoid 334 to place the apparatus in the bast forward mode. This provides a temporary stop before moving to the fast forward mode.

When changing directly to the rewind mode from a record mode, a similar chain of events takes place including the switching of $Q_{737}$ to provide a temporary stop while $Q_{737}$ is temporarily grounded before placing the apparatus in the rewind mode.

In addition, it is noted that during the reproducing, fast forward and rewind modes a brake control signal is obtained from output $O_7$ of IC 454. As a result, $Tr_4$ in indicating circuit 456 is turned ON and $Tr_{30}$ in motor control circuit 460 is turned OFF. Thus, motor 30 is driven and controlled in a conventional manner. As described above, if pause button 28 is depressed during reproduce or record modes, output $O_7$ of IC 454 maintains a "1" indication, see Table 1, thus $Tr_{30}$ is maintained OFF so that motor 30 continues to be driven in the pause mode. However, if pause button 28 is depressed while the apparatus is in the stop mode, no output is obtained from $O_7$ of IC 454, $Tr_{30}$ turns ON and motor 30 is not driven.

It is thus seen that with the mode selecting apparatus according to the present invention only a relatively light force on any of the mode selection push buttons is required in order to select the operating mode of a recording and/or reproducing apparatus. The motive force to place the apparatus is supplied by the selective actuation of one or more of the three plunger-solenoids which act on operating members selectively engageable with transmission members which, in turn, mechanically operate to place the apparatus in the selected operating mode.

Although an illustrative embodiment of the invention has been described in detail herein with reference to the accompanying drawings, it is to be understood that the invention is not limited to that precise embodiment, and that various changes and modifications can be effected therein by one skilled in the art without departing from the scope and spirib of the invention as defined in the appended claims.

We claim:

1. A mode selecting device for a tape recording and/or reproducing apparatus comprising: a plurality of mode selecting push-button members which are selectively actuable from rest positions to active positions for selecting corresponding operating modes of the apparatus, a plurality of electrically energizable driving means, circuit means for selectively energizing one or more of said driving means responsive to the actuation of a selected one of said push-button members, an operating member associated with each said driving means and being movable from an inoperative position to an operating position in response to the energizing of the associated driving means, a plurality of transmission members selectively engageable by selected ones of said operating members and movable between a first position and a second position when said operating member engaged therewith is moved from its inoperative position to its operative position, movement of selected ones of said transmission members from said first position to said second position being operative to establish the corresponding operating mode of the apparatus as determined by the selectively actuated push-button member the number of said driving means being less than the number of said transmission members, and means operable by one of said driving means for shifting the operating member associated with at least another of said driving means from effective engagement with one of said transmission members to effective engagement with another of said transmission members.

2. A mode selecting device as defined in claim 1, wherein said electrically energizeable driving means are solenoids having a plunger member movable from an extended position to a retracted position when the solenoid is energized and said operating member associated with each said solenoid is a lever member pivotally mounted within said apparatus and linked to said plunger member and pivotable from a first position to a second position upon movement of said plunger from its extended position to its retracted position.

3. A mode selecting device as defined in claim 2 wherein each said transmission member is a slide member having a segment operatively engageable with a selected one of said lever members and movable from said first position to said second position as said selected lever member pivots responsive to energization of its respective solenoid.

4. A mode selecting device as defined in claim 3 including means biasing each said transmission member and each said lever member to return said members to its said second position when its respective solenoid is deenergized.

5. A mode selecting device for a tape recording and/or reproducing apparatus comprising: at least five transmission members each being selectively movable between a first position and a second position for selective establishment of one of a plurality of operating modes for said apparatus, drive means within said apparatus for selectively driving magnetic tape in a forward, reverse and fast forward mode past transducer heads for selectively recording and reproducing magnetic signals on said tape, means in said apparatus for selectively engaging and disengaging said drive means responsive to selective activation of one of the operating modes of said apparatus, at least three electrically energizeable plunger means, which are less in number than the number of said transmission members, in said apparatus being selectively coupled to said transmission members to selectively move said transmission members beteen said first and second positions for selective establishment of one of the operating modes of said apparatus, a first one of said transmission members being directly coupled to a first one of said electrically energizeable plunger means, and means coupling said first plunger means to the remaining plunger means to alternately shift said remaining plunger members from one to another of respective pairs of the remaining transmission members such that energization and deenergization of said first plunger means operates to selectively place each remaining plunger means in cooperable engagement with one of the respective pairs of the remaining transmission members.

6. A mode selecting device as defined in claim 5; wheein said means coupling said first plunger means to the remaining plunger means comprises a slide member and an L-shaped interconnecting lever, one end of said lever being coupled to said first plunger means and the other end coupled to said slide, said slide being coupled to an operating member associated with each of the remaining plunger members whereby activation of said first plunger means moves said slide member thereby to move each of said operating members between a first position engaged with one of said respective pair of transmission members to a second position engaged with the other of said respective pair of transmission members.

7. A mode selecting device as defined in claim 5 wherein said transmission members comprise respective slide members movable within a common plane along parallel paths and wherein selected ones of said transmission members are coupled to said drive means to affect selected positioning of said drive means responsive to the selected operating mode of said apparatus.

8. A mode selecting device as defined in claim 5 wherein said apparatus includes brake means operatively associated with take-up and supply reel hubs and wherein selected ones of said transmission members are coupled to said brake means to effectively engage and disengage said brake means responsive to the selected operating mode of said apparatus.

* * * * *